US012093898B2

(12) United States Patent
Leslie

(10) Patent No.: US 12,093,898 B2
(45) Date of Patent: *Sep. 17, 2024

(54) EMPLOYMENT RELATED BROWSING AND MATCHING APPLICATION, METHOD AND SYSTEM

(71) Applicant: Swipejobs, Inc., Austin, TX (US)

(72) Inventor: Katrina Lee-Anne Leslie, New South Wales (AU)

(73) Assignee: Swipejobs, Inc., Austin, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 16/919,364

(22) Filed: Jul. 2, 2020

(65) Prior Publication Data
US 2021/0027252 A1    Jan. 28, 2021

Related U.S. Application Data

(63) Continuation of application No. 15/028,584, filed as application No. PCT/AU2014/050284 on Oct. 13, 2014, now Pat. No. 10,706,389.

(51) Int. Cl.
G06Q 10/10        (2023.01)
G06F 16/9535      (2019.01)
(Continued)

(52) U.S. Cl.
CPC ..... *G06Q 10/1053* (2013.01); *G06F 16/9535* (2019.01); *G06Q 10/10* (2013.01); *H04L 67/306* (2013.01); *H04W 4/029* (2018.02)

(58) Field of Classification Search
CPC    G06Q 10/1053; G06Q 10/10; G06F 16/9535; H04L 67/306; H04W 4/029; H04W 4/02
(Continued)

(56) References Cited

U.S. PATENT DOCUMENTS 6,385,620 B1    5/2002    Kurzius et al.
8,451,246 B1    5/2013    Scholler
(Continued)

FOREIGN PATENT DOCUMENTS

WO    WO 2015/051421 A1    4/2015

OTHER PUBLICATIONS

Sullivan P., A Dynamic Analysis of Educational Attainment, Occupational Choices, and Job Search, 65 pgs, Sep. 2006.
(Continued)

*Primary Examiner* — Jonathan P Ouellette
(74) *Attorney, Agent, or Firm* — Husch Blackwell LLP

(57) ABSTRACT

Disclosed is a method and system for enabling a job seeker to browse a plurality of job classifieds or a job provider to browse a plurality of job seeker profiles. The method includes generating and storing a job seeker profile for the job seeker based upon job seeker information a location of the job seeker; identifying a plurality of job classifieds stored in the data store which are relevant to the job seeker based upon the job seeker profile; serving the plurality of job classifieds to the mobile device for presentation to the job seeker; receiving job seeker feedback data indicative of whether each job classified was relevant or not relevant; analysing the job seeker feedback data; and updating the job seeker profile stored in the data store in accordance with the analysis of the job seeker feedback data.

20 Claims, 19 Drawing Sheets

(51) Int. Cl.
  *G06Q 10/06* (2023.01)
  *G06Q 10/105* (2023.01)
  *G06Q 10/1053* (2023.01)
  *G06Q 30/08* (2012.01)
  *H04L 67/306* (2022.01)
  *H04W 4/029* (2018.01)

(58) Field of Classification Search
  USPC .................................................. 705/1.1–912
  See application file for complete search history.

(56) References Cited

U.S. PATENT DOCUMENTS

| | | | |
|---|---|---|---|
| 8,458,100 | B1 | 6/2013 | Nowak, Jr. |
| 9,904,725 | B1 | 2/2018 | Hedges et al. |
| 10,586,212 | B2 | 3/2020 | Leslie |
| 10,706,389 | B2 | 7/2020 | Leslie |
| 2002/0002479 | A1 | 1/2002 | Almog et al. |
| 2004/0001103 | A1 | 1/2004 | Fliess et al. |
| 2004/0024761 | A1 | 2/2004 | Kolbe |
| 2006/0265270 | A1* | 11/2006 | Hyder ................ G06Q 10/1053 705/321 |
| 2008/0010365 | A1 | 1/2008 | Schneider |
| 2008/0046170 | A1 | 2/2008 | DeGrazia |
| 2008/0071746 | A1 | 3/2008 | Concordia et al. |
| 2008/0316183 | A1 | 12/2008 | Westeman et al. |
| 2009/0070126 | A1 | 3/2009 | MacDaniel et al. |
| 2009/0204471 | A1 | 8/2009 | Elenbaas et al. |
| 2010/0324970 | A1 | 12/2010 | Phelon et al. |
| 2012/0095931 | A1* | 4/2012 | Gurion ............... G06Q 10/1053 705/321 |
| 2013/0024105 | A1* | 1/2013 | Thomas ................ H04W 4/023 701/410 |
| 2013/0097093 | A1 | 4/2013 | Kolber et al. |
| 2013/0282606 | A1 | 10/2013 | Bhagat |
| 2013/0282626 | A1* | 10/2013 | White .................... G06F 17/00 706/11 |
| 2014/0074824 | A1 | 3/2014 | Rad et al. |
| 2014/0136314 | A1* | 5/2014 | Kiet .................. G06Q 30/0242 705/14.41 |
| 2016/0300191 | A1 | 10/2016 | Leslie |
| 2016/0321614 | A1 | 11/2016 | Leslie |
| 2017/0147984 | A1 | 5/2017 | Zoia et al. |
| 2017/0323268 | A1 | 11/2017 | Zhang et al. |
| 2020/0118056 | A1 | 4/2020 | Leslie |
| 2020/0311687 | A1 | 10/2020 | Leslie |

OTHER PUBLICATIONS

Siting Z., Job Recommender Systems: A Survey, The 7th International Conference on Computer Science and Education (ICCSE 2012), Melbourne, Australia, 5 pgs., Jul. 14-17, 2012.

Aytug et al., "A Review of Machine Learning in Scheduling," IEEE Transactions on Engineering Management (vol. 41, Issue 2, May 1994), pp. 165-171, May 1994.

International Appln No. PCT/AU2014/050284; Written Opinion/Search Report, 12 pages, dated Nov. 7, 2014.

Application and File history for U.S. Appl. No. 15/028,584, filed Apr. 11, 2016. Inventors: Leslie.

Application and File history for U.S. Appl. No. 15/141,548, filed Apr. 28, 2016. Inventors: Leslie.

* cited by examiner

EMPLOYMENT RELATED BROWSING AND MATCHING APPLICATION, METHOD AND SYSTEM

RELATED APPLICATION

This application is a continuation of U.S. application Ser. No. 15/028,581 filed Apr. 11, 2016, now U.S. Pat. No. 10,706,389 issued Jul. 7, 2020, which in turn is a U.S. National Stage Entry of PCT/AU2014/050284 filed Oct. 23, 2014, which claims the benefit of U.S. Provisional Application No. 61/889,846 filed Oct. 11, 2013, each of which is hereby fully incorporated herein by reference.

FIELD OF INVENTION

The present invention relates to a method, system, mobile device, software product, server processing system, and computer readable medium for enabling browsing and matching of job classifieds and/or job seeker profiles for a user.

BACKGROUND

Currently, when a job seeker (i.e. potential employee) conducts a search for a job via a mobile job classified search engine, the job seeker is generally required to input details such as a keyword related to the job they are searching for such as job title, location and terms of employment (i.e. full time, part time, etc.). Generally, this is quite a tedious task for the job seeker to input these details each time a search is conducted. Some job search engines allow for the job seeker to store search criteria such that when the user can re-run the search without inputting the search criteria again. However, such a search strategy is generally quite broad as the criteria that the user is willing to input to browse job classifieds is fairly limited. Attempts by a job seeker to use standard search techniques to narrow the volume of job classifieds they view have the unintended consequence of limiting their career alternatives to positions with titles that are similar to their current positions.

Additionally, when an employer wishes to identify potential employees for a particular job that needs to be filled, it is common that the employer will place a job classified advertisement with a job classified website or the like. However, the employer must then filter through the applications from potential employees which can be a tedious task. Another common technique is that the employer may engage a recruiter to identify potential employees. This is not ideal, as the recruiter may not have fully appreciated the skill set that the potential employee requires for the employer, thus time is wasted in finding the appropriate employee. Furthermore, the cost of using a recruiter is considerable.

Therefore there is a need to overcome or at least alleviate one or more of the above-mentioned problems or provide a useful alternative.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

In a first aspect there is provided a method for enabling a job seeker to browse a plurality of job classifieds via a mobile device operated by the job seeker, wherein the method includes a server processing system performing the following steps:

generating and storing in a data store a job seeker profile for the job seeker based upon job seeker information accessed from one or more networking services used by the job seeker and a location of the job seeker provided by a location service of the mobile device;

identifying a plurality of job classifieds stored in the data store which are relevant to the job seeker based upon the job seeker profile;

serving the plurality of job classifieds to the mobile device for presentation to the job seeker via a mobile application executing upon the mobile device;

receiving job seeker feedback data indicative of whether each job classified was relevant or not relevant via the job seeker's interaction with a graphical user interface of the mobile application;

analysing the job seeker feedback data; and updating the job seeker profile stored in the data store in accordance with the analysis of the job seeker feedback data, such that the server processing system serves future job classifieds to the job seeker based upon the updated job seeker profile.

In certain embodiments, the method includes the server processing system generating the job seeker profile for the job seeker further based upon information input by the job seeker via the mobile application.

In certain embodiments, the method includes the server processing system aggregating at least a portion of the plurality of job classifieds from one or more third party processing systems.

In certain embodiments, the method includes:

the server processing system receiving a request from the job seeker to view more information for one of the plurality of job classifieds which was indicated as relevant; and the server processing system transferring a network address associated with the respective job classified to the mobile device for presentation to the job seeker, wherein the network address is associated with one of the third party processing systems.

In certain embodiments, the method includes:

the server processing system receiving a referral request from the job seeker to refer one of the job classifieds to a second job seeker; and the server processing system transferring a referred job classified to a device associated with the second job seeker.

In certain embodiments, the method includes the server processing system generating and serving one or more hypothetical job classifieds to the mobile device to confirm or update a portion of the job seeker profile based on the job seeker feedback data in relation to the job seeker's interaction with the one or more hypothetical job classifieds.

In certain embodiments, the one or more networking services include at least one of:

one or more personal social network services; and
one or more corporate network services.

In certain embodiments, the job seeker profile of the job seeker includes at least one of:

working history;
set of working skills;
job preference; and
location preference.

In certain embodiments, the method includes the server processing system using discrete choice modeling to update the job seeker profile based on the job seeker feedback data.

In certain embodiments, the server processing system has stored in the data store a plurality of job seeker profiles for a respective plurality of job seekers, wherein the method includes:

generating and storing in a data store a job provider profile for a job provider based upon job provider information accessed from one or more networking services associated with the job provider;

identifying a plurality of job seeker profiles stored in the data store which are relevant to the job provider based upon the job provider profile;

serving the plurality of job seeker profiles to a second mobile device operated by the job provider for presentation to the job provider via a second mobile application executing upon the second mobile device;

receiving job provider feedback data indicative of whether each job seeker profile was relevant or not relevant via the job provider's interaction with a graphical user interface of the second mobile application;

analysing the job provider feedback data; and updating the job provider profile stored in the data store in accordance with the analysis of the job provider feedback data, such that the server processing system serves future job seeker profiles to the job provider based upon the updated job provider profile.

In certain embodiments, the method includes the server processing system generating and serving one or more hypothetical job seeker profiles to the second mobile device to confirm or update a portion of the job provider profile based on the job provider feedback data in relation to the job provider's interaction with the one or more hypothetical job seeker profiles.

In a second aspect there is provided a server processing system configured to perform the method of the first aspect.

In a third aspect there is provided a computer readable medium including executable instructions which, when executed by the server processing system, cause the server processing system to perform the method of the first aspect.

In a fourth aspect there is provided a computer readable medium of a mobile device for enabling a job seeker to browse a plurality of job classifieds via a mobile device operated by the job seeker, wherein the computer readable medium includes executable instructions for configuring the mobile device to:

facilitate a server processing system to generate and store in a data store a job seeker profile for the job seeker based upon job seeker information accessed from one or more networking services used by the job seekerand a location of the job seeker provided by a location service of the mobile device;

receive and present via a mobile application a plurality of job classifieds from the server processing system which are considered relevant by the server processing system to the job seeker based upon the job seeker profile; and generate and transfer job seeker feedback data indicative of whether each job classified was relevant or not relevant via the job seeker's interaction with a graphical user interface of the mobile application, wherein the job seeker feedback data is analysed by the server processing system to allow the job seeker profile to be updated in accordance with the analysis such that future job classifieds to the job seeker are based upon the updated job seeker profile.

In certain embodiments, the job seeker interacts with the graphical user interface with a first swiping gesture in a first direction to indicate that one of the job classifieds currently presented is not relevant and a second swiping gesture which is parallel and in an opposite direction to the first direction to indicate that one of the job classifieds currently presented is relevant.

In a fifth aspect there is provided a mobile device configured according to a computer readable medium in accordance with the fourth aspect.

In a sixth aspect there is provided a computer readable medium of a mobile device for enabling a job provider to browse a plurality of job seeker profiles via a mobile device operated by the job provider, wherein the computer readable medium includes executable instructions for configuring the mobile device to:

facilitate a server processing system to generate and store in a data store a job provider profile for the job provider based upon job provider information accessed from one or more networking services associated by the job provider;

receive and present via a mobile application a plurality of job seeker profiles from the server processing system which are considered relevant by the server processing system to the job provider based upon the job provider profile; and generate and transfer job provider feedback data indicative of whether each job seeker profile was relevant or not relevant via the job provider's interaction with a graphical user interface of the mobile application, wherein the job provider feedback data is analysed by the server processing system to allow the job provider profile to be updated in accordance with the analysis such that future job seeker profiles served to the job provider are based upon the updated job provider profile.

In a seventh aspect there is provided a mobile device configured according to a computer readable medium according to the sixth aspect.

In an eighth aspect there is provided a system to enable a job seeker to browse a plurality of job classifieds via a mobile device operated by the job seeker, wherein the system includes a server processing system and a mobile device, wherein the server processing system and the mobile device are in communication with each other via a network, wherein the server processing system is configured according to second aspect and the mobile device is configured according to the fifth aspect.

Other aspects and embodiments will be appreciated throughout the description provided herein.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EXAMPLE EMBODIMENTS

Figure 1:
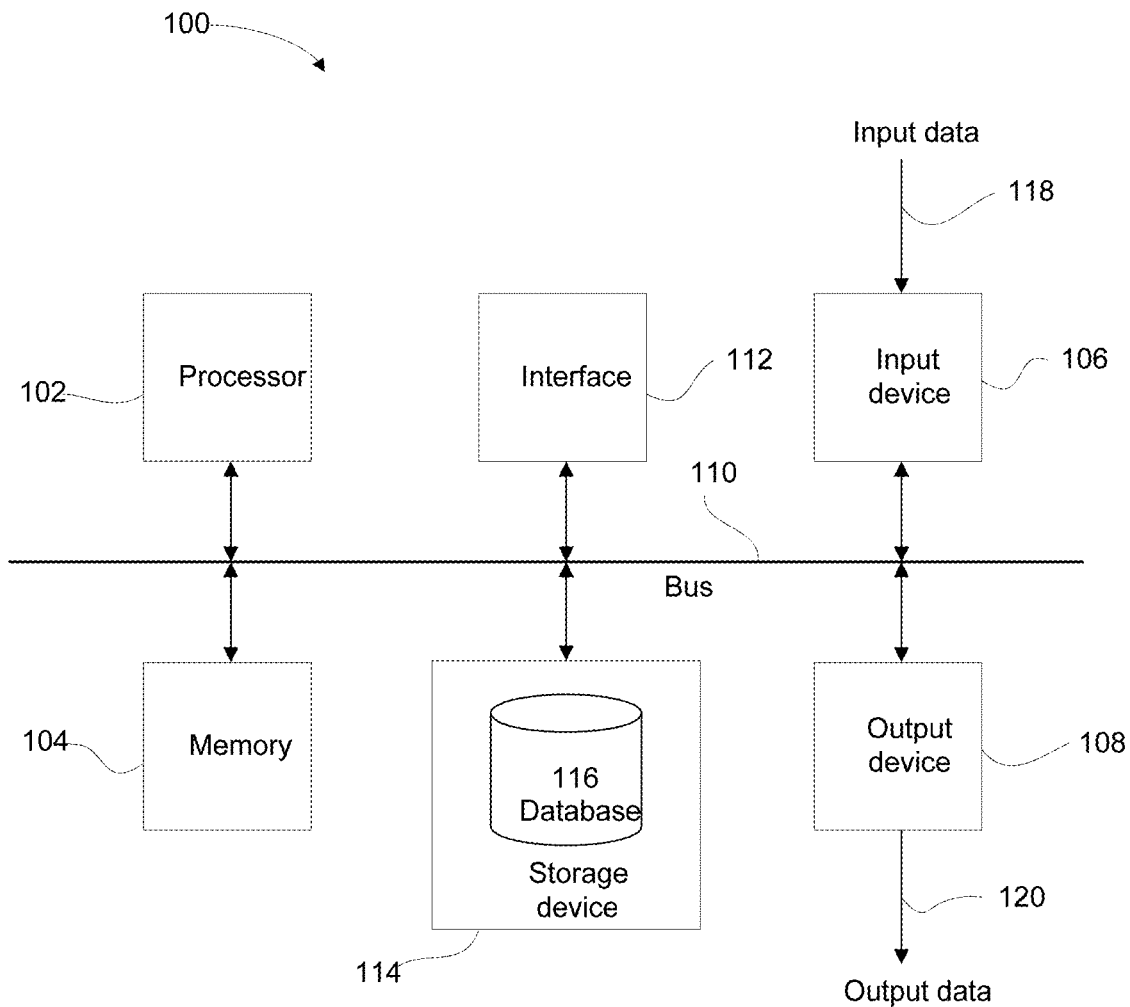
FIG. 1 illustrates a functional block diagram of an example processing device that can be utilized to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Overview

Embodiments of the present invention enable users (job seekers or job providers) to browse job classifieds or job seeker profiles that are served by a server processing system to a mobile device. A server processing system maintains a user profile (job seeker profile or job provider profile) that is updated based on feedback data received from the user's interaction with previously presented job classifieds or job seeker profiles via the mobile device such that job classifieds or job seeker profiles which are served to the user over time are optimized to be more relevant for the user.

The mobile device is configured according to a mobile application. In relation to a job seeker, the mobile application configures the mobile device to present job classifieds to the user of the mobile device. The mobile application enables collection of information in relation to the job seeker's work details, preference and location data by accessing a job seeker's online social media information and network (e.g. Facebook, LinkedIn, etc) and the mobile device's geolocation service respectively. The job seeker also has the option to manually add any personal information as desired. Data is submitted and analysed by the server processing system to create a job seeker profile.

The server processing system serves a plurality of job classifieds from a database to the job seeker's mobile device based on the job seeker's profile. Upon receiving the plurality of job classifieds, the job seeker is presented with a job stack interface wherein the job seeker disregards or shortlists each job classified to progress through the job stack interface via interaction with the Graphical User Interface (GUI) of the mobile application. In particular, the job seeker can swipe a job classified in a first direction (e.g. left) to disregard the job classified, or by swiping the job classified in a second and opposite direction (e.g. right) to shortlist the job. In the shortlist, the job seeker can directly apply for the job through the mobile application, or the mobile application can direct the job seeker to the source of the job classified (i.e. job classified website). The shortlist also allows the user the ability to review more information about the job, remove the job from the shortlist, and rank jobs based on individual preference. The job seeker also has the option to refer the job classified to other job seekers. Feedback data indicative of the user disregarding or shortlisting jobs (or ranking shortlisted jobs) can be used by the server processing system to update the user profile for the job seeker such that more relevant job classifieds are served to the user over time.

In relation to a job provider, the mobile application can facilitate the collection of recruiting information and location data which are collected by accessing the job provider's online social media information and network (e.g. Facebook, LinkedIn) and optionally utilizing the mobile device's geolocation service respectively. The job provider also has the option to manually add any information or any job as desired. The collected data is submitted and analyzed by the server processing system for creating a job provider profile. The server processing system serves to the mobile device a plurality of job seeker profiles which are identified from a database as relevant based on the job provider's profile. The job seeker profiles are indicative of job seekers who are using the system to browse through job classifieds as described above. The job provider is presented with a job seeker profile stack interface wherein the job provider progresses through the job seeker profile stack similarly to that described above in relation to the job stack whilst simultaneously providing feedback regarding the relevance of each job seeker profile to the job provider. Feedback data indicative of the job provider disregarding or shortlisting each job seeker profile can be used by the server processing system to update the job provider profile such that more relevant job seeker profiles are served to the job provider over time. The job provider can contact one of the shortlisted job seekers directly through the mobile application, for example in order to arrange a job interview or offer the job seeker a job.

Example Processing System

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing device 100 may be any form of terminal, PC, laptop, notebook, tablet, smart phone, specialised hardware, or the like.

Figure 2:
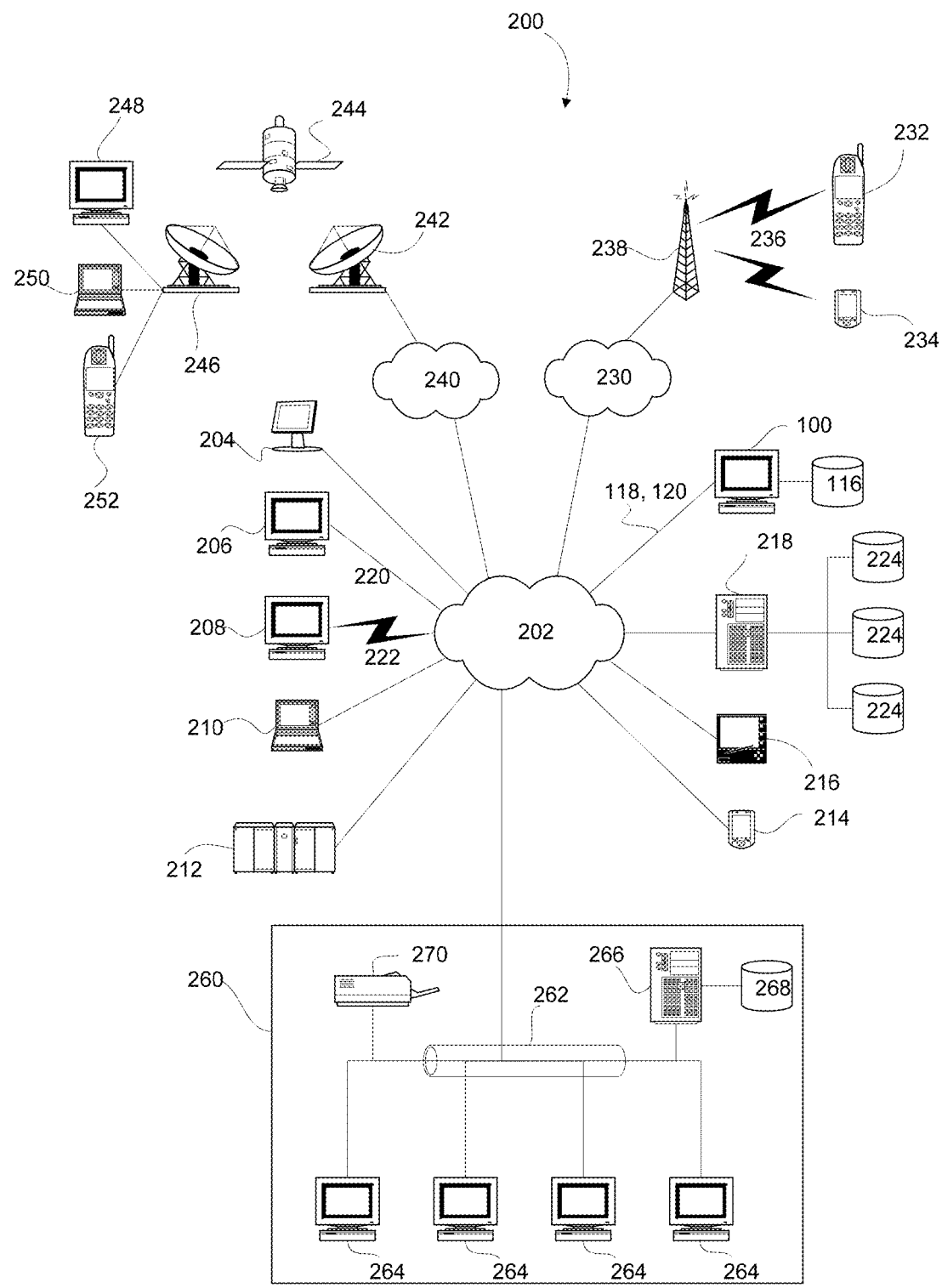
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Example Embodiments

Figure 3:
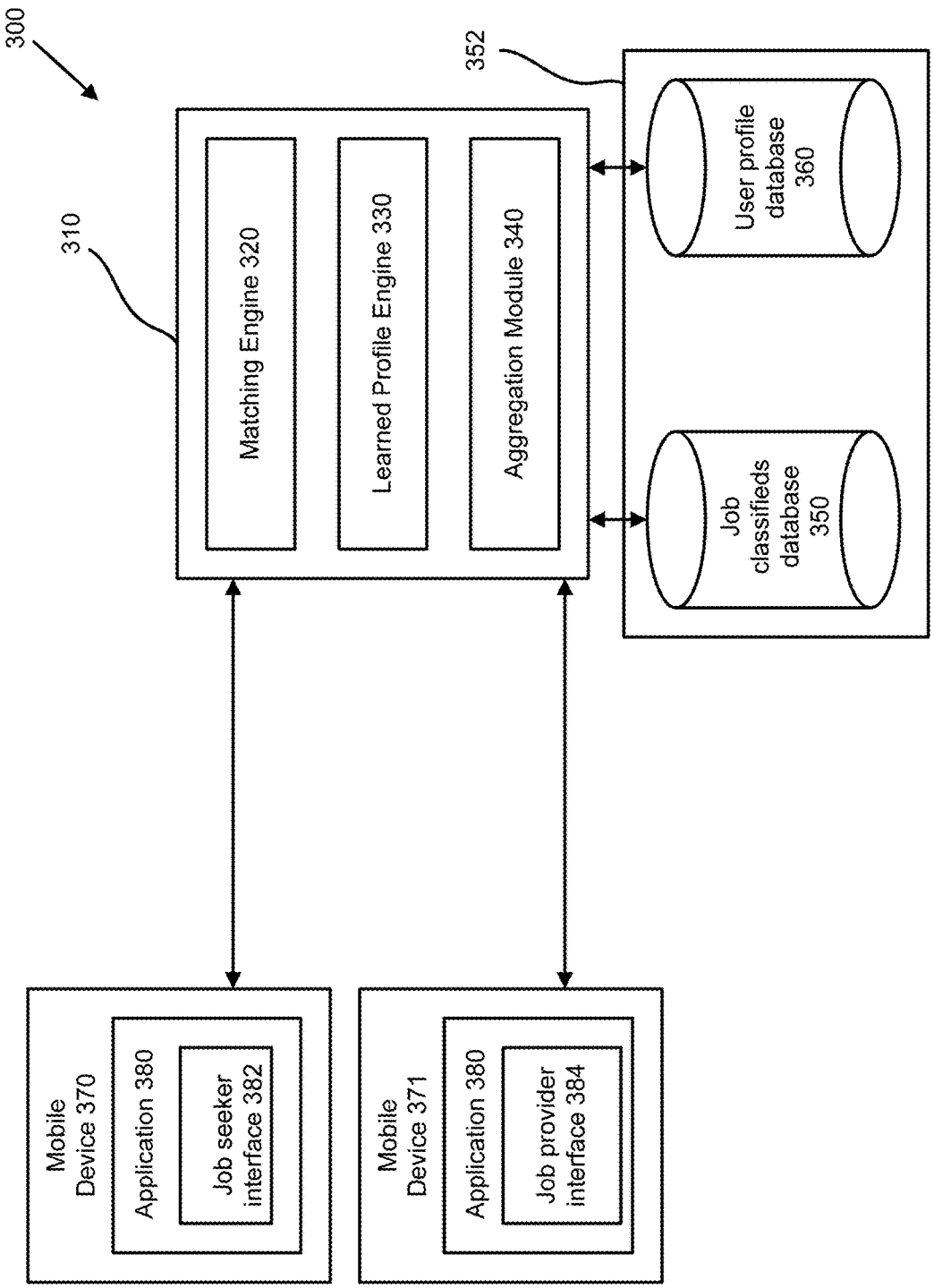
FIG. 3 illustrates a block diagram representing an example system for enabling browsing of job classifieds and job seeker profiles.

Referring to FIG. 3, there is illustrated a system diagram of a system 300 for enabling job classifieds and/or job seeker profile browsing by users. In particular, the system 300 includes a server processing system 310 in data communication with a first and second mobile device 370, 371, preferably smart phones or tablet processing systems, etc., via a one or more communication networks. The first mobile device 370 is operated by a job seeker and the second mobile device 371 is operated by a job provider. It will be appreciated that the system can includes a plurality of first and second mobile device 370, 371 operated by a respective plurality of job seekers and job providers. The server processing system 310 is able to access or include a data store 352 including a user profile database 360 and a job classifieds database 350. It will be appreciated that user profile database 360 and job classifieds database 350 can be hosted by the server processing system 310, however it is equally possible that the user profile database 360 and the job classifieds database 350 are hosted by other database serving processing systems. Processing system 100 is suitable for operation as the server processing system 310. The server processing system 310 includes a matching engine 320, a learned profile engine 330 and an aggregation module 340 which will be discussed in more detail in various examples below.

The mobile devices 370, 371 include a processor, a memory, an input and output device preferably provided in the form of a touch screen interface, and a communication device. Preferably, the mobile device 370, 371 includes a GPS (Global Positioning System) module 375. Preferably the mobile devices 370, 371 have stored in the memory a mobile device optimized application 380 which can be downloaded by the mobile devices 370, 371 from a software repository processing system. The user can register with the server processing system as a job seeker or a job provider. In the event that the user registers as a job seeker, a job seeker interface 382 will be presented via the mobile application 380 via their respective mobile device 370. In the event that the user registers as a job provider, a job provider interface 384 will be presented via the mobile application 380 via their respective mobile device 371. However, it will be appreciated that two separate mobile applications could be provided for the two different types of users in alternate arrangements.

Figure 4A:
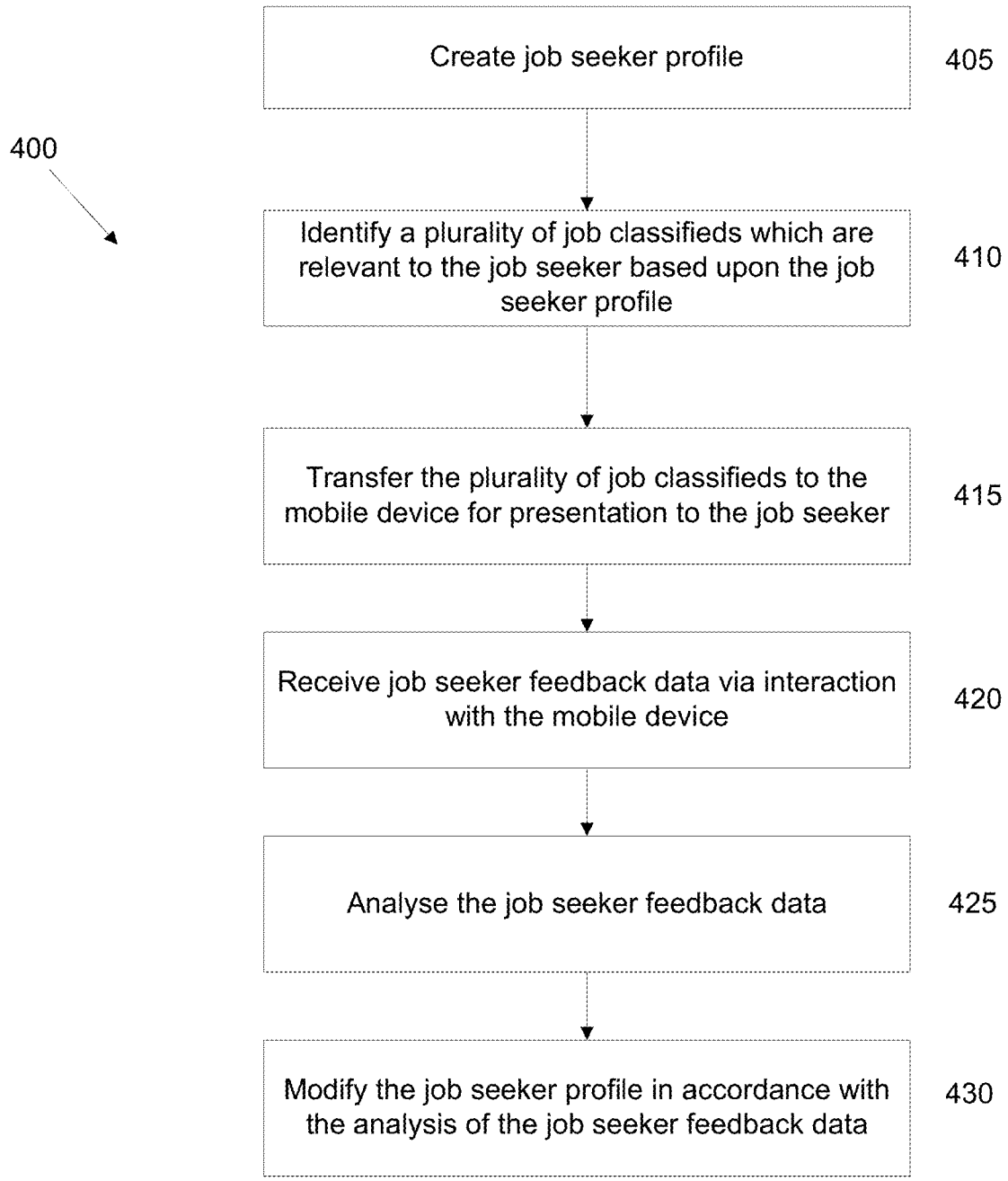
FIG. 4A illustrates a flowchart representing an example method performed by a server processing system for serving job classifieds to a mobile device for browsing by a job seeker.

Referring to FIG. 4A there is shown a flowchart that represents an example method 400 performed by the server processing system 310 in relation to a job seeker.

In particular, at step 405 the method 400 includes the server processing system 310 creating a job seeker profile record indicative of a job seeker profile that is stored in the user profile database 360 of the data store 352. At step 410 the method 400 includes the server processing system 310 identifying a plurality of job classifieds that are relevant to the job seeker based upon the job seeker profile stored in the data store 352. At step 415, the method 400 includes the server processing system 310 transferring a plurality of job classifieds to the mobile application 380 for presentation to the job seeker as a job classified stack interface. At step 420, the method 400 includes the server processing system 310 receiving job seeker feedback data indicative of whether each job classified was relevant or irrelevant to the job seeker via user interaction with the mobile device 370 during progression through the job classified stack interface. At step 425, the method 400 includes the server processing system 310 analyzing the job seeker feedback data. At step 430, the method 400 includes the server processing system 310 updating the job seeker profile in accordance with the analysis of the job seeker feedback data 670 such that future job classifieds which are presented to the job seeker are identified in accordance with the updated job seeker profile.

Figure 4B:
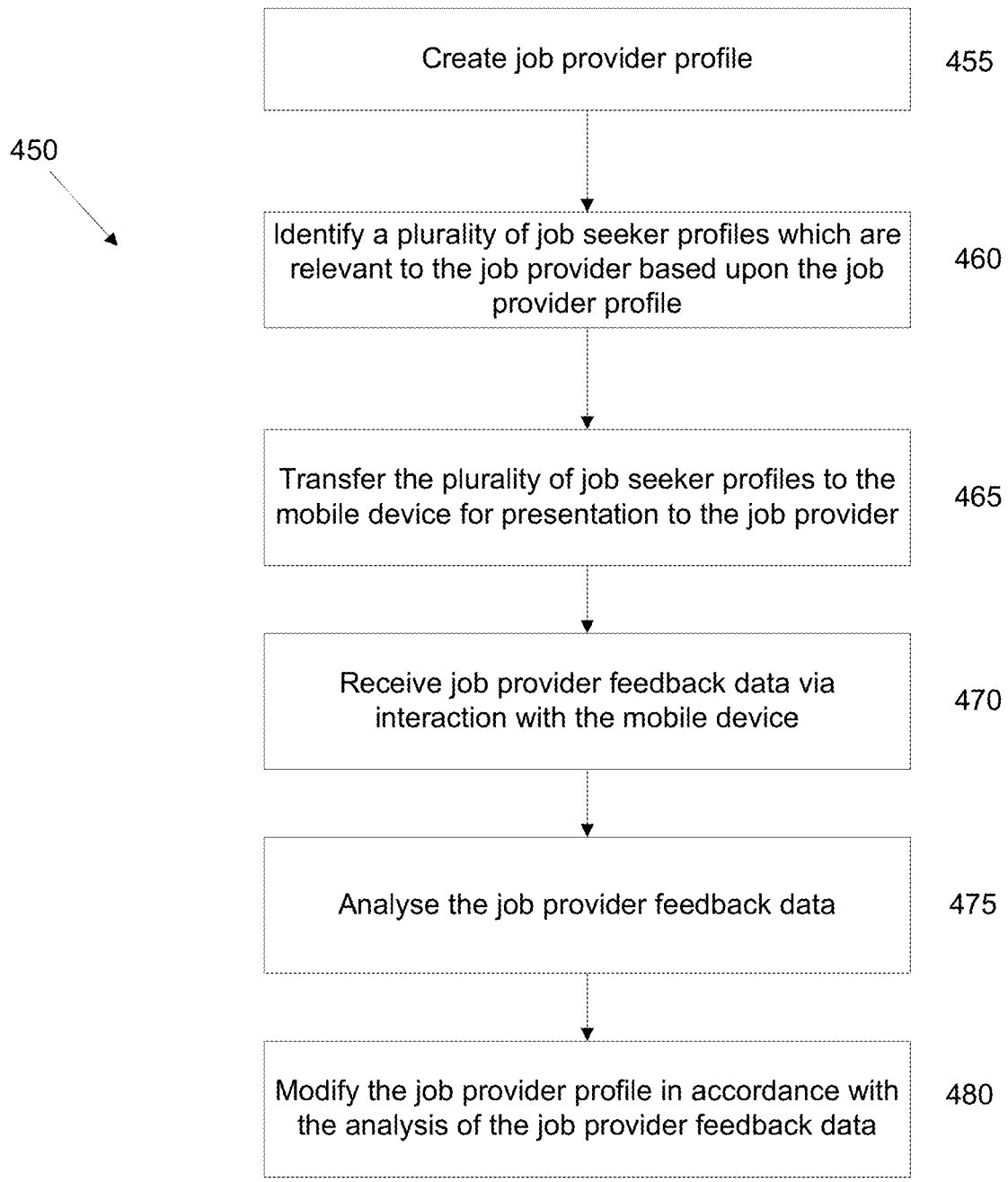
FIG. 4B illustrates a flowchart representing an example method performed by a server processing system for serving job seeker profiles to a mobile device for browsing by a job provider.

Referring to FIG. 4B there is shown a flowchart that represents an example method 450 performed by the server processing system 310 in relation to a job provider.

In particular, at step 455 the method 450 includes the server processing system 310 creating a job provider profile that is stored in the user profile database 360 of the data store. At step 460 the method 450 includes the server processing system 310 identifying a plurality of job seeker profiles from the job seeker profile records stored in the user profile database 360 which are relevant to the job provider based upon the job provider profile. The job seeker profiles are indicative of job seekers looking for a job as discussed in relation to FIG. 4A. At step 465, the method 450 includes the server processing system 310 transferring data indicative of the identified job seeker profiles to the mobile application 380 for presentation to the job provider as a job seeker profile stack interface. At step 470, the method 450 includes the server processing system 310 receiving job provider feedback data indicative of whether each job seeker profile was relevant or irrelevant to the job provider via user interaction with the mobile device 371 during progression through the job seeker profile stack interface. At step 475, the method 450 includes the server processing system 310 analyzing the job provider feedback data. At step 480, the method 400 includes the server processing system 310 updating the job provider profile in accordance with the analysis of the job provider feedback data such that future job seeker profiles presented to the job provider are identified in accordance with the updated job provider profile.

Figure 5A:
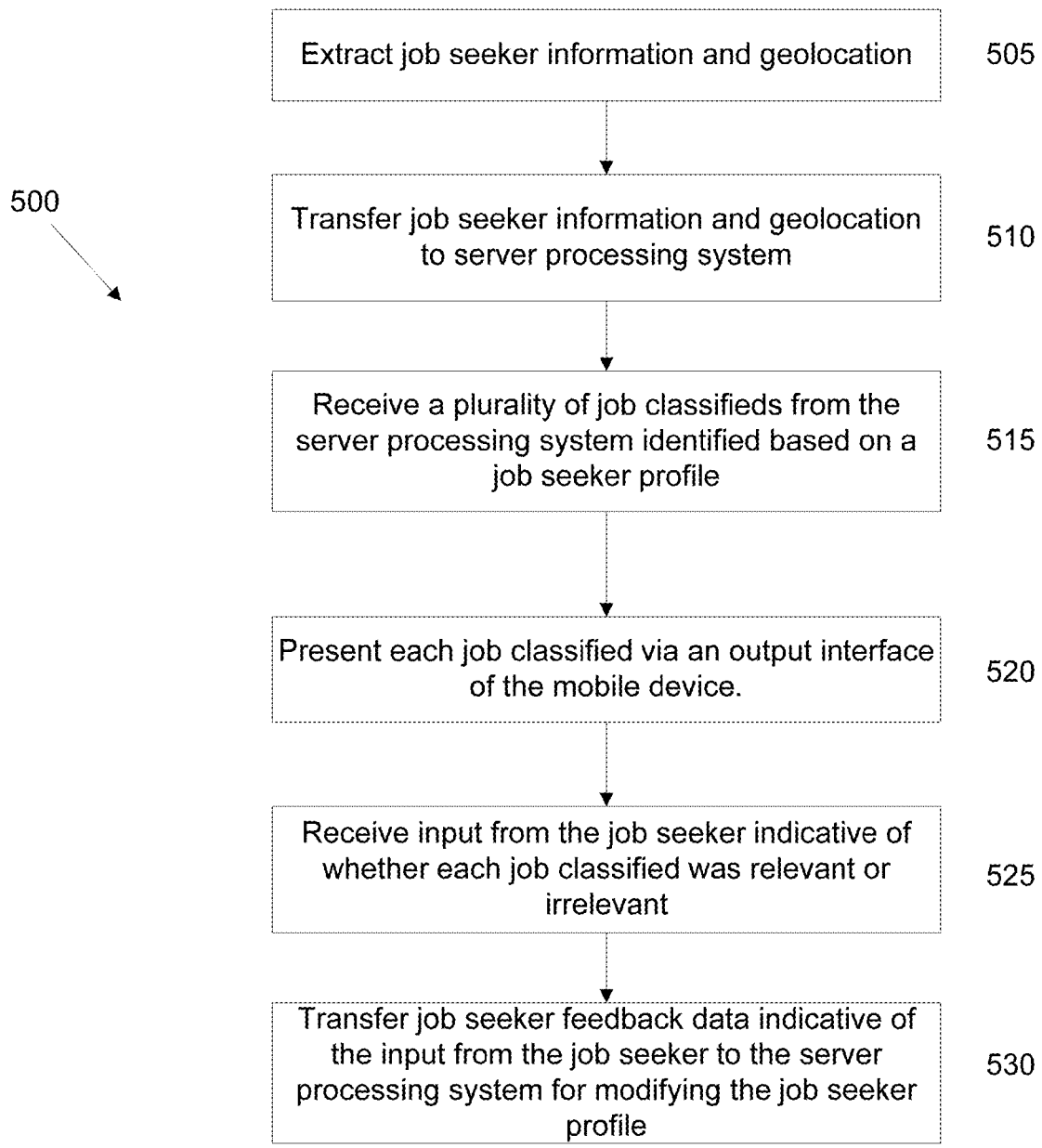
FIG. 5A illustrates a flowchart representing an example method performed by a mobile device for presenting job classifieds to a job seeker.

Referring to FIG. 5A there is shown a flowchart representing a method 500 performed by the mobile device 370 for a job seeker.

In particular, at step 505, the method 500 includes the mobile device 370 facilitating extraction of job seeker information from the job seeker's online social media content and online social network and a location of the mobile device. At 510, the method 500 includes submitting data facilitating extraction of job seeker information and the location of the mobile device to the server processing system 310 for storage and analysis to enable the generation of the job seeker profile. At step 515, the method 500 includes the mobile device 370 receiving data indicative of a plurality of job classifieds from the server processing system 310, wherein the plurality of job classifieds are identified based on the job seeker profile. At step 520, the method 500 includes the mobile device 370 presenting a job stack interface of the job classifieds via an output interface of the mobile device 370. At step 525, the method 500 includes receiving input from the job seeker interacting with an input interface of the mobile device 370, wherein the input is indicative of whether each job classified was relevant or irrelevant to the job seeker whilst simultaneously progressing through the stack interface. More specifically, upon being presented with a particular job classified from the job stack interface, the job seeker can interact with the graphical user interface by making a swiping gesture on the touch screen of the mobile device 370 to indicate whether the job classified was relevant or irrelevant to the job seeker. For example, the job seeker can indicate a particular job classified is irrelevant by using a swiping gesture in a left direction wherein the job classified is deleted from the stack, and the job seeker indicates a particular job classified is relevant by using a swiping gesture in a right direction wherein the job classified is added to a shortlist. At step 530, the method 500 includes transferring job seeker feedback data indicative of the input from the job seeker to the server processing system 310 for updating the job seeker profile such that future job classifieds received from the server processing system 310 are based on the updated job seeker profile.

Figure 5B:
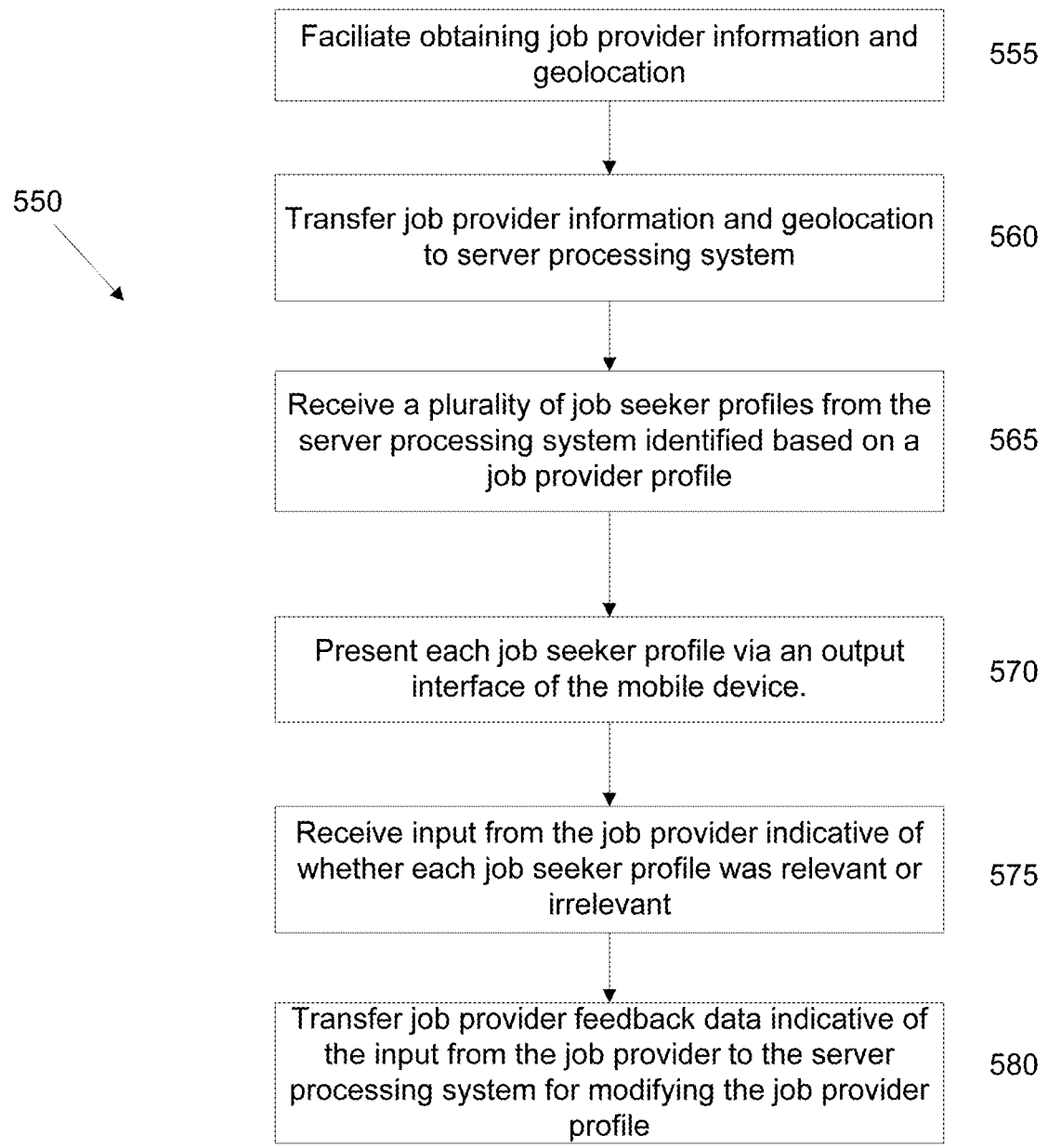
FIG. 5B illustrates a flowchart representing an example method performed by a mobile device for presenting job seeker profiles to a job provider.

Referring to FIG. 5B there is shown a flowchart representing a method 550 performed by the mobile device 371 for a job provider.

In particular, at step 555, the method 550 includes the mobile device 371 facilitating extraction of job provider information from the job provider's online social media content and online social network, and a location of the mobile device 371. At 560, the method 550 includes submitting data facilitating extraction of job provider information and the location of the mobile device to the server processing system 310 for storage and analysis to enable the generation of the job provider profile. At step 565, the method 550 includes the mobile device 371 receiving data indicative of a plurality of job seeker profiles from the server processing system 310, wherein the plurality of job seeker profiles are identified based on the job provider profile. At step 570, the method 550 includes the mobile device 371 presenting a stack interface of the job seeker profiles via an output interface of the mobile device 371. At step 575, the method 550 includes receiving input from the job provider interacting with an input interface of the mobile device 371, wherein the input is indicative of whether each job seeker profile was relevant or irrelevant to the job provider whilst simultaneously progressing through the stack interface. More specifically, upon being presented with a particular job seeker profile from the stack interface, the job provider can interact with the graphical user interface by making a swiping gesture on the touch screen of the mobile device 371 to indicate whether the job seeker profile was relevant or irrelevant to the job provider. For example, the job provider can indicate a particular job seeker profile is irrelevant by using a swiping gesture in a left direction wherein the job seeker profile is deleted from the stack, and the job provider indicates a particular job seeker profile is relevant by using a swiping gesture in a right direction wherein the job seeker profile is added to a shortlist. At step 580, the method 550 includes transferring job provider feedback data indicative of the input from the job provider to the server processing system 310 for updating the job provider profile such that future job seeker profiles received from the server processing system 310 are based on the updated job provider profile.

Figure 6A:
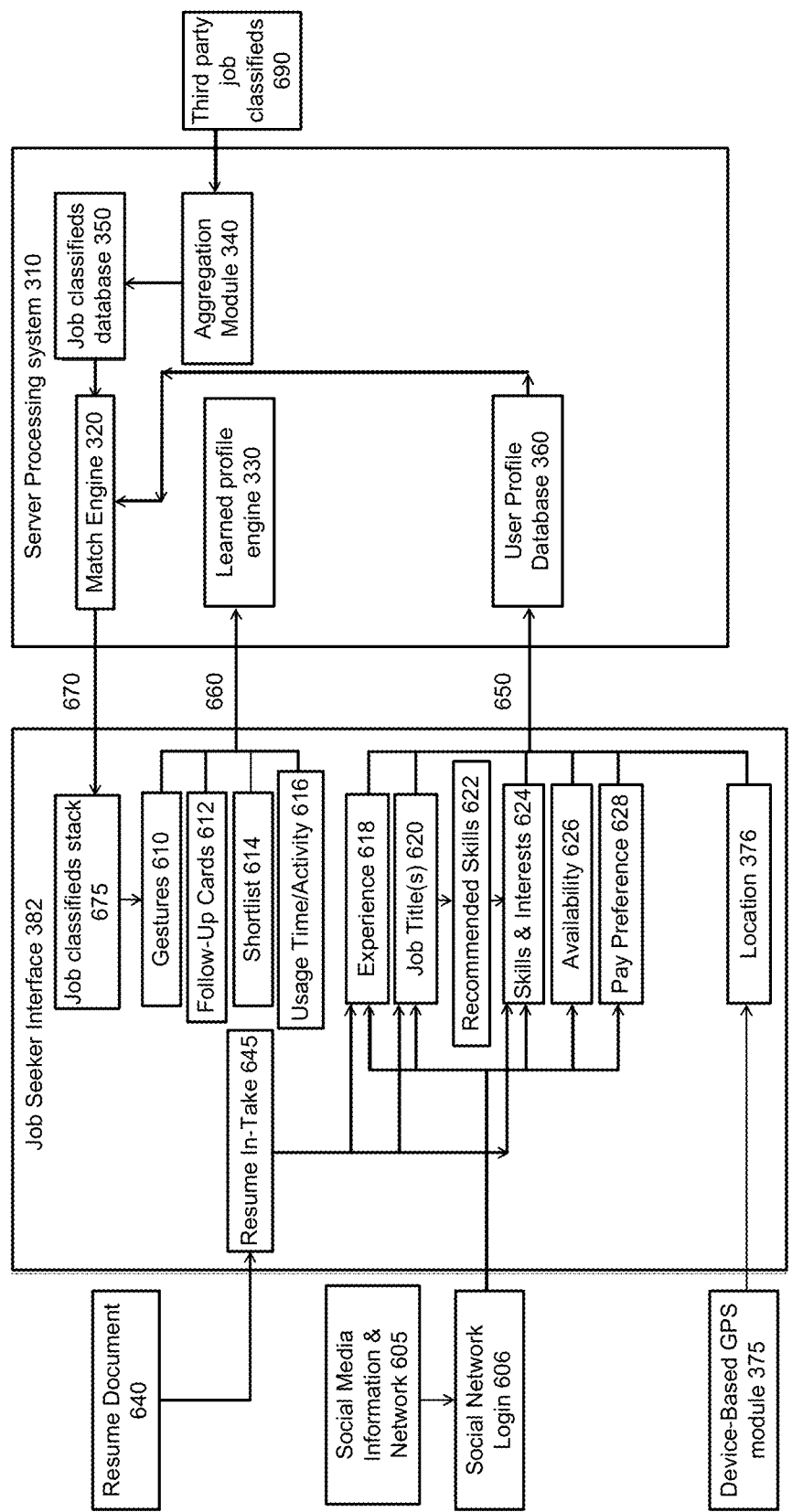
FIG. 6A illustrates system diagram representing a portion of the system for enabling browsing of job classifieds.

Referring to FIG. 6A, there is illustrated a more detailed system diagram of a portion of the system for enabling a job seeker to browse job classifieds via the job seeker interface 382 of the mobile application 380.

In particular, a job seeker can login to the system 600 using login credentials 606 for a social network account 605. A job provider can login to the system using their personal social network account or a social network account of the job providing organization.

Various data sources can be used by the server processing system 310 to create the initial job seeker profile stored in the user profile database 360 prior to receiving feedback data 660 from the mobile device. In particular, data associated with an online social network account 605, which is hosted by a social network processing system, can be extracted by the mobile application 380 of the mobile device 370 or the server processing system 310 to populate one or more profile properties of the respective user profile. For example, in relation to an online corporate or non-corporate social network, career related data such as the job seeker's experience 618, job title(s) 620, skills and interests 624, availability (part time, full time, etc.) 626, pay preference 628 and/or existing connections (e.g. employment of connections in corporate or non-corporate social network of the user) can be obtained or inferred by the mobile device 370 or the server processing system 310 from the social network processing system to generate the user's initial user profile. The application 382 may also recommend skills 382 to the job seeker for confirmation based on the various data extracted above.

Generally, the server processing system 310 presents a request via the mobile device 370 for explicit user permission to access such data from the social network account 605. The server processing system 310 can extract data from the social network account 605 using an API provided by the social network processing system.

In some instances, data accessed from a personal social network 605 may not be considered sufficient by the server processing system 310 to populate a sufficient number of profile properties of the job seeker profile. In this situation, the server processing system 310 may present a survey via the mobile device 370 for completion by the user. The survey may be presented in the form of a short gamified survey. Results from the survey as well as the other collected information 650 are transferred to the server processing system 310 for use in generating the initial user profile which is stored in the user profile database 360. Further short gamified surveys will be triggered from time to time based on the learned profile and the preferences of employers, or follow-up questions based on user behavior to better define user preferences.

Likewise, to populate a sufficient number of job seeker profiles, the application 380 may also access externally stored, electronic resume or curriculum vitae (CV) files 640 via a resume in-take module 645 through the appropriate access or via electronic communication, wherein particular profile properties can be defined based on the document 640.

Location data 376 associated with the operation of the mobile device 370 can also be utilized by the server processing system 310 to generate an initial job seeker profile as well as modifying the user profile over time. In particular, the location data 376 may be generated by the device-based GPS module 375 of the mobile device 370 which is then transferred to the server processing system 310 to generate the initial user profile or modify an existing user profile in the user profile database 360.

Passive data can also be obtained by the server processing system 310 from a carrier entity associated with the mobile device 370 in order for the server processing system 310 to generate an initial job seeker profile or update an existing job seeker profile. Such passive data may include user data and location data. Conclusions drawn by the server processing system 310 using the passive data may require the server processing system 310 to request confirmation from the job seeker of the mobile device 370 prior to uploading one or more profile properties to the job seeker profile.

The server processing system 310 includes an aggregation module 340 which aggregates job classifieds from a number of third party job classified processing systems 690 which are then modified for presentation via a mobile device 370 and stored in the job classifieds database 350.

The server processing system 310 also includes a matching engine 320 for identifying a plurality job classifieds 670 from the job classifieds database 350 which relevant to the user based upon the job seeker profile.

The server processing system 310 also includes a learned profile engine 330 which receives the feedback data 660 from the user regarding whether each job classified from the job stack 675 was considered relevant or irrelevant to the job seeker based on user input 610. The learned profile engine 330 analyses the feedback data 660 based on the job seeker's current job seeker profile, and then updates the job seeker profile of the job seeker in the user profile database 360 if required based on the results of the analysis.

Specifically, the learned profile engine 330 can employ a number of techniques to modify the job seeker profile is optimized to thereby supply increasingly relevant job classifieds based on previous application interactions. In particular, information from gestures 610, follow-up cards 612 (as will be discussed in more detail below), activities within the shortlist 614 or other passive and active interactions 616) can be used.

Figure 13:
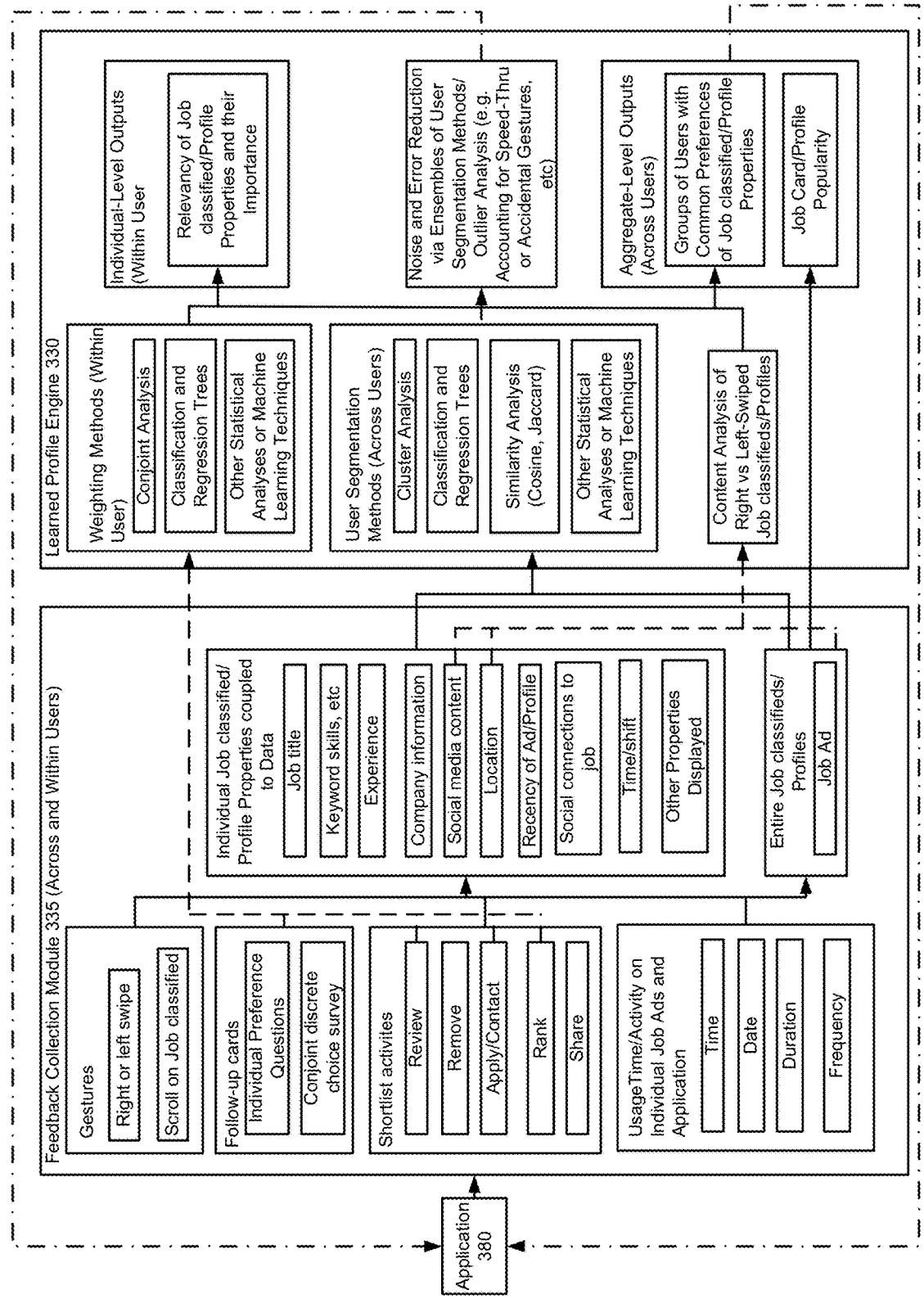
FIG. 13 illustrates a block diagram representing an example combination of analysis techniques performed by the learned profile engine of the server processing system.

Referring to FIG. 13, gestures in the application by the user, functions used within the shortlist, as well as application usage activity can be coupled together. This combined information is analyzed through statistical cluster analysis, classification and regression trees, similarity analyses (Cosine or Jaccard similarity comparisons), or any other related statistical or machine learning techniques to derive segments of users (e.g., those who find particular properties or groups of properties appealing). These analyses can be compared and membership in various groups, which emerge from the data, combined into meaningful preferences leveraged for deriving relevant properties in subsequent job classifieds and job seeker profiles. Data aggregated by a feedback collection module 335 of the server processing system 330 can couple gestures, shortlist activities, and usage activity with entire job classifieds. Feedback collected can include passive and direct feedback. The results of applying these data to the same analyses as above may determine additional segments which might be useful, but also to account for noise and error in the data. Specifically, users may provide accidental gestures or hurry through the job feed, and such data should be flagged and removed through the results of one of an analysis or combination of analyses.

Data collected from follow-up cards (which may include individual preference questions or a conjoint/discrete choice survey) and specific shortlist activities (e.g., applying for a job, contacting a job seeker, or ranking job classifieds/profiles in the shortlist), can be used to weight various job classifieds or profile properties. This can be done through the conjoint analysis, classification and regression trees, or other statistical or machine learning techniques.

Text analysis and natural language processing can derive additional properties from job classifieds and profiles that are relevant to the user. Using input from the job classifieds and profiles various important combinations of properties can be delineated among the user base. For example, among some job seekers, the co-occurrence of a specific employer, location, and specific skillset in a job ad may be uniquely relevant, above and beyond what would be expected based on the individual preference of its component parts.

In combining these three aspects, weighting, user segmentation, and text analytic methods, useful job classifieds and profile properties can be delineated and their relative importance determined for each user. This information enables the supply improved job classifieds and job seeker profiles. Consequently, over a number of iterations, the platform is able to provide matches to users that are entirely relevant. Outputs are both individual (i.e., within user) and collective (i.e., useful across users) in nature—both informing subsequent job classifieds/job seeker profiles presented in the application.

In certain instances, a particular job classified which the match engine 320 expected to be highly relevant to the job seeker may be indicated by the job seeker as being irrelevant. In response to the feedback data 660, the server processing system 310 may communicate with the application 380 to present a follow-up card requesting further feedback from the user. In particular, portions of the particular job classified can be selected by the job seeker as being highly relevant or highly irrelevant. In one form, portions of the job classified may wobble, wherein the job seeker can select particular elements (i.e. pay, employer, job title, etc.) of the job classified to delete, wherein the further feedback data is transferred back to the server processing system for analysis by the learned profile engine for updating the job seeker profile.

Figure 6B:
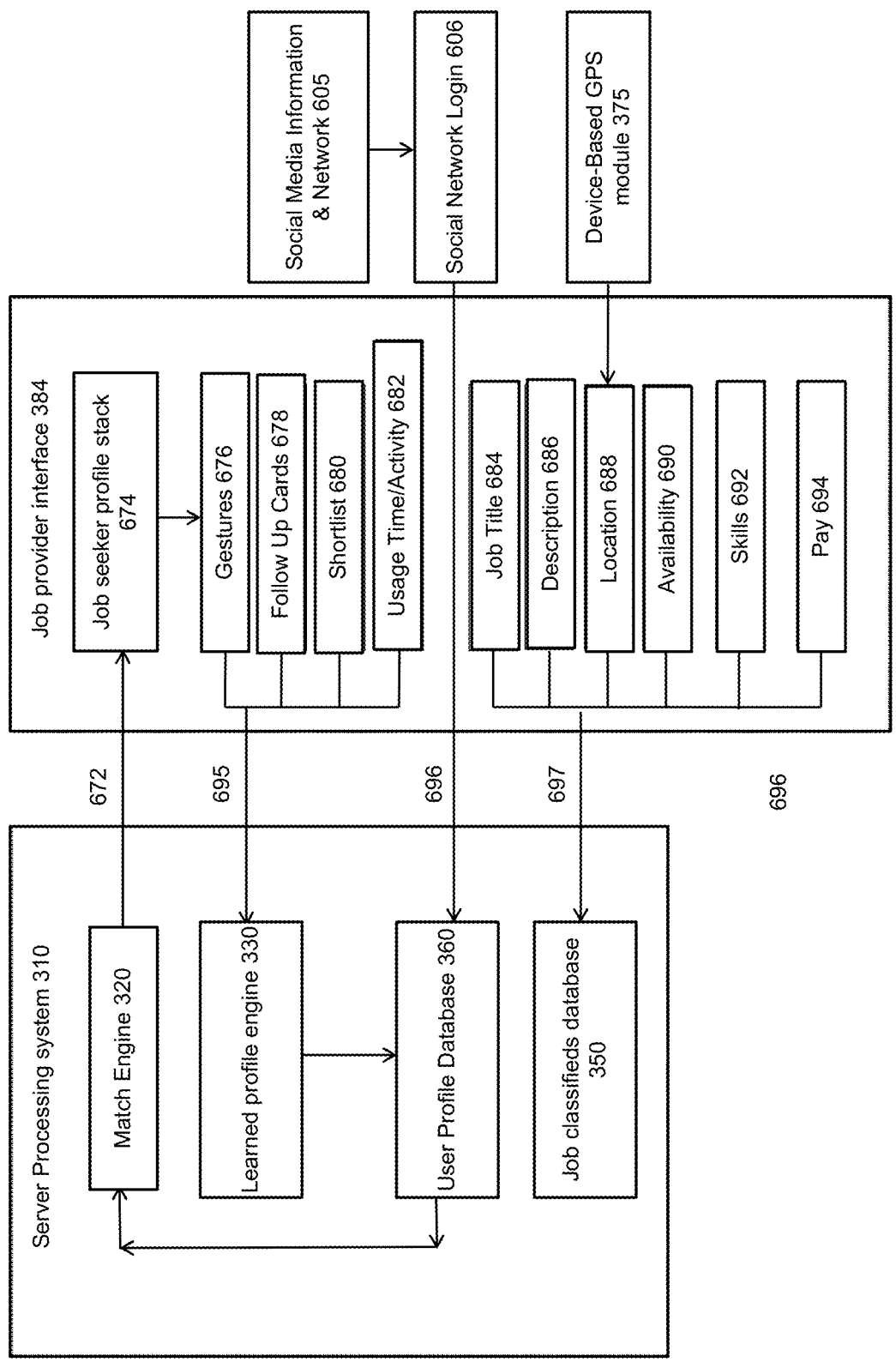
FIG. 6B illustrates system diagram representing a portion of the system for enabling browsing of job seeker profiles.

Referring to FIG. 6B there is shown a more detailed system diagram of a portion of the system for enabling a job provider to browse job seeker profiles via the job provider interface 384 of the mobile application 380.

In certain instances, a particular job classified which the match engine 320 expected to be highly relevant to the job seeker may be indicated by the job seeker as being irrelevant. In response to the feedback data 660, the server processing system 310 may communicate with the application 380 to present a follow-up card requesting further feedback from the user. In particular, portions of the particular job classified can be selected by the job seeker as being highly relevant or highly irrelevant. In one form, portions of the job classified may wobble, wherein the job seeker can select particular elements (i.e. pay, employer, job title, etc.) of the job classified to delete, wherein the further feedback data is transferred back to the server processing system for analysis by the learned profile engine for updating the job seeker profile. In particular, the job provider interface allows the job seeker to login to the system using login credentials 606 from a social media network 605. A job provider profile can be generated by extracting data from the social media account associated with the job provider.

This can include corporate online social network accounts (e.g. Starbucks' Facebook page or Starbucks' LinkedIn page). The job provider interface 384 also enables the job provider to submit a job classified for storage in the job classifieds database 350. In particular, data such as the job title 684, description 686, location 688, availability 690, required skills 692, and pay 694 may be input be the job provider to define a job classified for storage in the job classifieds database 350. In particular arrangements, the location may be determined based upon the device based GPS module 375 of the mobile device 371. A portion of the required skills that are input may be suggested by the application 380 based upon other data entered such as the job title and description. In particular embodiments, the job provider profile may also be defined at least partially based upon the job classified that is uploaded into the job classifieds database 350.

The match engine 320 identifies a plurality of job seeker profiles 672 from the user profile database 360 based upon the job provider profile. The job seeker profile stack 674 is then presented by the job provider interface 384 for the user to progress through as discussed above in relation tot eh job stack interface 675. Feedback data 695 indicative of gestures 676, follow-up cards 678, ranking of shortlisted job seeker profiles 680 and other passive data 682 (i.e. usage time/activity) is transferred from the mobile device 371 to the server processing system for analysis by the learned profile engine 330. The learned profile engine 330 can perform similar types of analysis to that discussed above to determine whether particular properties of the job provider profile can be inferred resulting in modifications to the respective job provider profile in the job provided database.

Figure 7A:
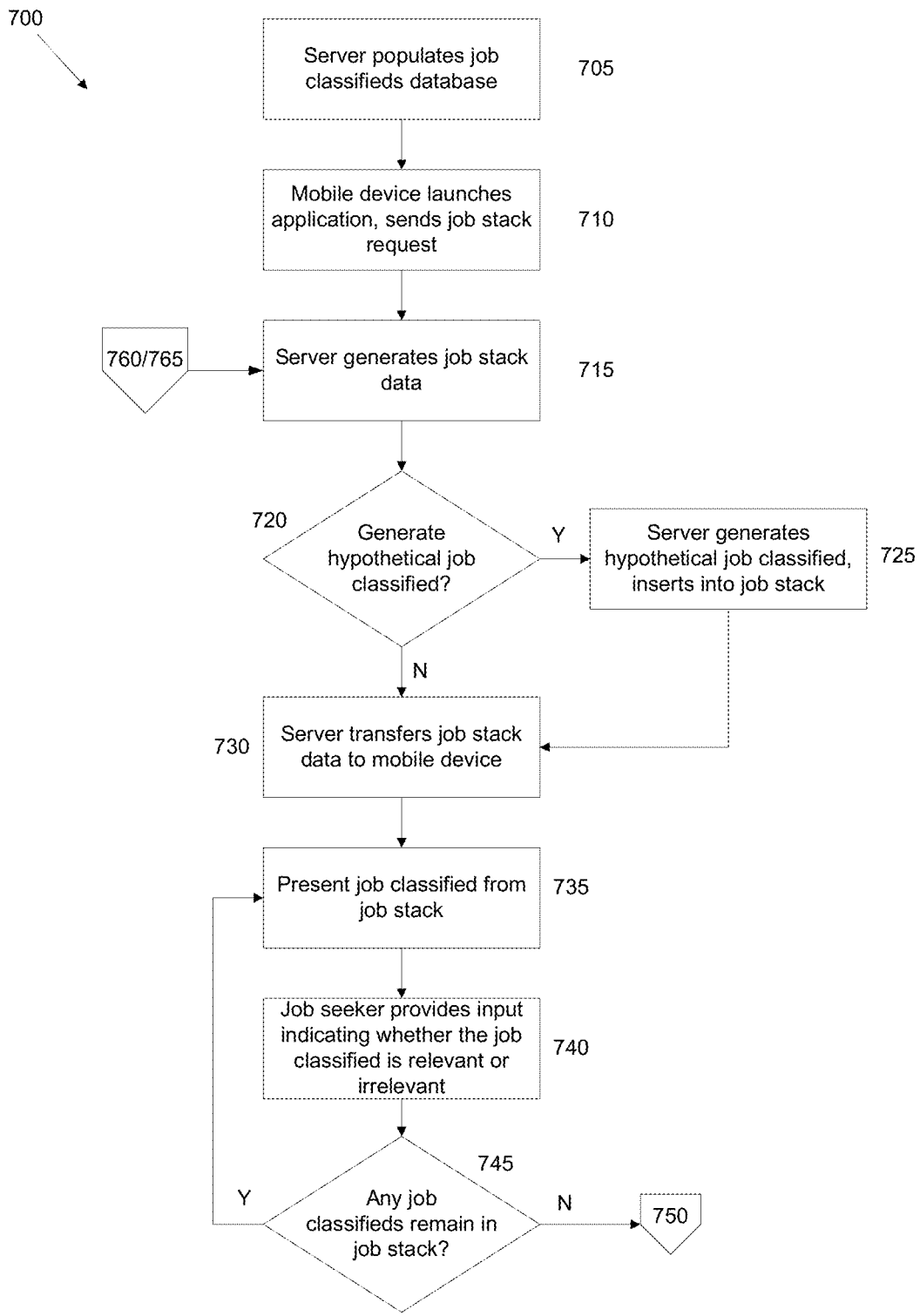
FIGS. 7A and 7B illustrate a flowchart representing a further method for enabling browsing of job classifieds.
Figure 7B:
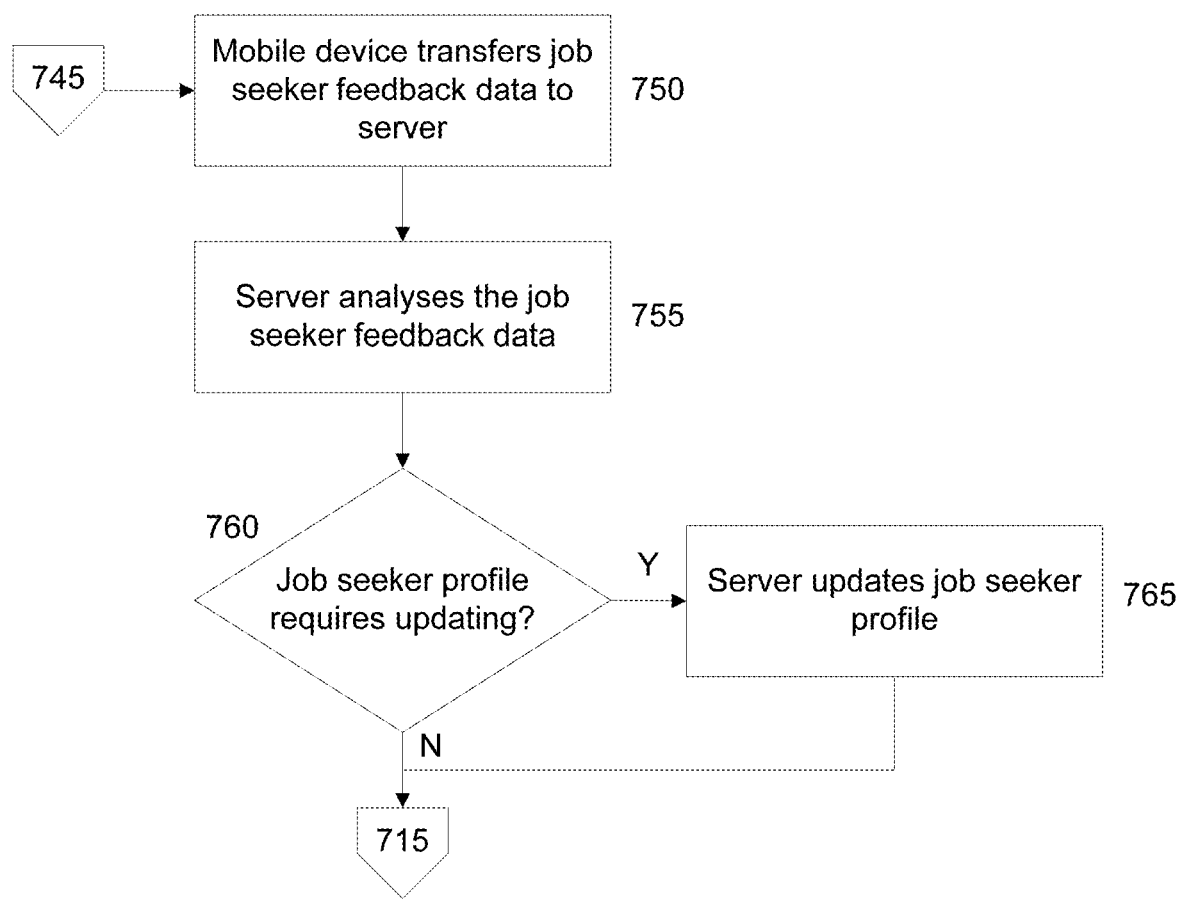

In certain instances, a particular job seeker profile which the match engine 320 expected to be highly relevant to the job provider may be indicated by the job provider as being irrelevant. In response to the feedback data 695, the server processing system 310 may communicate with the application 380 to present a follow-up card requesting further feedback from the job provider. In particular, portions of the particular job seeker profile can be selected by the job provider as being highly relevant or highly irrelevant. In one form, portions of the job seeker profile may undergo a wobble animation, wherein the job seeker can select particular elements (i.e. experience, skills, etc.) of the job seeker profile to delete, wherein the further feedback data is transferred back to the server processing system for analysis by the learned profile engine 330 for updating the job provider profile Referring to FIGS. 7A and 7B there is shown a flowchart illustrating a more detailed method 700 performed by the system 600 for enabling a job seeker to browse job classifieds via a mobile device 370.

In particular, at step 705, the method 700 includes the server processing system 310 populating the job classifieds database with job classified records. In one form, the aggregation module 340 accesses one or more third party processing systems 690 that provide job classifieds. The server processing system 310 analyses each job classified to codify the job of the job classified according to a job taxonomy index. The job taxonomy index can be hosted by a third party processing system which the server processing system 310 queries to codify the job. A job classified record is then generated and stored in the job classifieds database 350. Each job classified record includes the job type identified by the server processing system 310 using the job taxonomy index, a textual summary of the job which the server extracts from or generates using the third party job classified, one or more job elements (i.e. pay/salary, distance from job seeker's home, a date of the classified being published, the type of employment (full time, part time, and required education, etc.), desired work hours or availability on the part of either the job seeker or job provider. Each job classified record can be indexed by the server processing system 310 according to the job type. The textual summary can be exacted from the textual description of the job classified published by the third party processing system or alternatively can be generated based on the textual description generated by a summarizer engine hosted or accessed by the server processing system 310.

In an additional or alternative form, a job provider seeking an employee can provide a job classified submission to the server processing system 310 via an electronic form to populate the job classified database 350 with a job classified record. The electronic form can include predefined preference optimizing elements. The electronic form can be hosted by the server processing system 310 and presented to the job provider via a job provider processing system for completion. Fields of the electronic record can then be completed by the job provider at the job provider processing system and submitted to the server processing system 310. The server processing system 310 generates and stores a job classified record in the job classified database 350 using a similar process to that discussed above when obtaining the job classified from a third party processing system.

At step 710, the method 700 includes the job seeker launching the application 380 on the mobile device 370. In response to launching the application 380, a job stack request is transferred by the mobile device 370 under control of the application 380 to the server processing system 310.

At step 715, the method 700 includes the server processing system 310 generating job stack data 670. In particular, the server processing system 310 determines a user identity associated with the stack request and then determines the job seeker profile stored in the user profile database 350 based on the user identity. The server processing system 310 then controls the matching engine 320 to generate the job stack data 670 indicative of a plurality of relevant job classifieds based on the job seeker profile. In particular, job classifieds which are considered most relevant to the job seeker based the respective job seeker profile form part of the job stack data 670.

The job stack data 670 may include a predetermined number of job classifieds, such as eight job classifieds. The server processing system 310 preferably has stored in memory or has access to a remote data storage means which includes historical viewing data indicative of job classifieds which the user has already viewed. The job match engine 320 can generate the job stack data 670 taking into account the historical viewing data such that one or more job classifieds that have been previously presented to the user are not represented. In addition, the job stack data 670 is indicative of an order of presentation of the job classifieds. In particular, two similar job classifieds may be stored in the job stack 670 to be presented one after another such that the learned profile engine 330 can perform a pairwise comparison based on the feedback data 660 to potentially derive one or more profile properties.

At step 720, the method 700 includes the server processing system 310 determining whether one or more hypothetical job classifieds are to be generated and inserted into the job stack data 670. In particular, the server processing system determines whether a threshold number of job classifieds have been previously presented to the job seeker which the job seeker has indicated as being irrelevant. In the event of a negative determination, the method proceeds to step 730. In response to a positive determination, the method proceeds to step 725.

At step 725, the method 700 includes generating a hypothetical job classified that is inserted into the job stack data 670. In particular, the server processing system 310 retrieves from the job classifieds database 350 a job classified which the user indicated as being irrelevant to the job seeker. The server processing system 310 then identifies, using the job seeker profile of the job seeker, one or more elements of the job classified to delete or modify to create the hypothetical job classified. The server processing system 310 then inserts the hypothetical job classified into the job stack data 670. It will be appreciated that one of the job classifieds in the job stack data 670 may be purged to accommodate the hypothetical job classified. The hypothetical job classified is visually presented by the mobile device 370 to clearly indicate to the job seeker that the job classified is hypothetical such that the server processing system 310 can infer particular profile properties for adjusting the job seeker profile.

At step 730, the method 700 includes the server processing system 310 transferring the job stack data 670 to the mobile device 370 for presentation to the job seeker. The job stack data 670 is stored in memory of the mobile device 370.

Figure 9A:
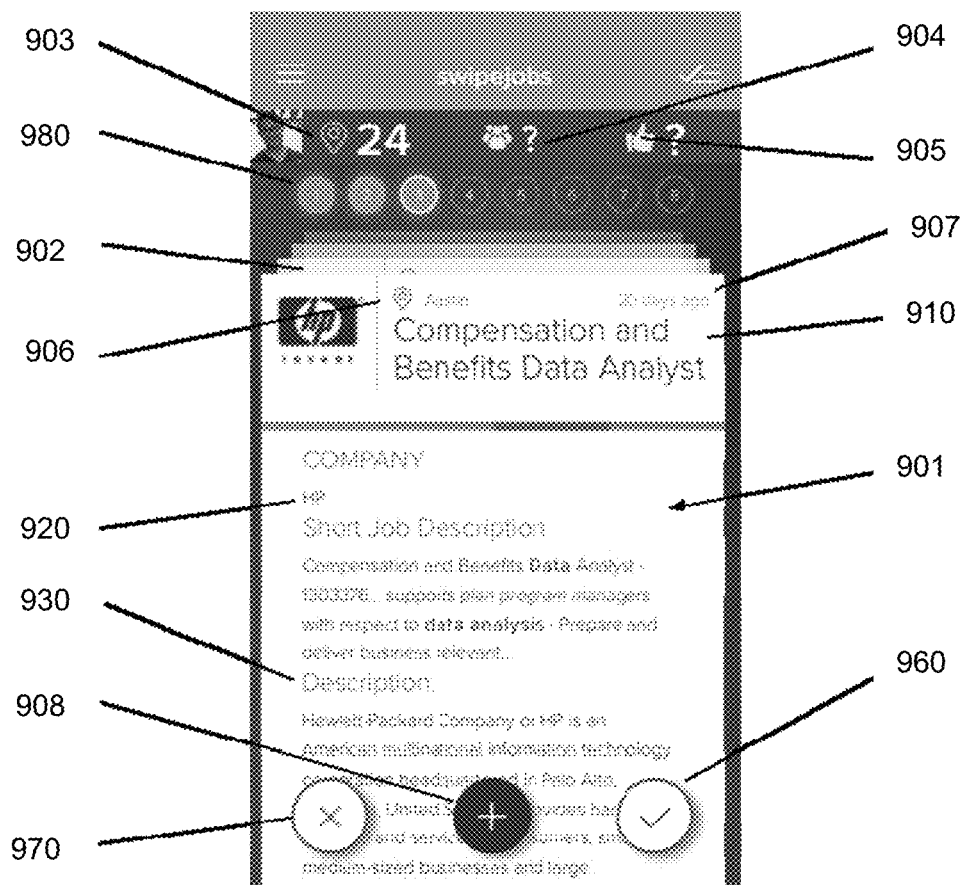
FIGS. 9A and 9B illustrates an example user interface for enabling browsing of job classifieds.
Figure 9B:

At step 735, in response to receiving the job stack data 670 the method 700 includes the application 380 presenting the job stack 675 wherein one of the job classifieds 901 from the stack 675 to the job seeker. An example of the job seeker interface presenting one of the job classifieds 901 is shown in FIG. 9A. The job seeker interface presents a number of the job seeker's online social connections in the same geographic area 903, the job seeker's online social connections to the job provider 904, the number of "Likes" for the job provider 905, the a job title 910, the employer 920 associated with the job classified, a number of days the classified has been published 907, a location of the job classified 906, and other job properties such as the type of employment (full time, part time, and required education, etc.), pay/salary, distance from user's home. The job classified can optionally include a colour identifier. The color provides a visual cue to the job seeker about the current job classified 901 and the job classified showing beneath 902 it in the stack by color. The colour displayed can follow a rule set in which certain colours are reserved for certain types of job matches. For example, a job with a high probability of matching the job seekers profile may be associated with a first colour; a job that is suitable for referral to a friend on a social network may be associated with a second colour; and a job that is presented with hypothetical criteria to improve the job seeker profile is associated with a third colour. In addition, the job seeker interface provides a visual indicator 960, 970 of a direction which the job seeker should perform a swiping gesture to provide input indicative of whether the respective job classified is relevant or irrelevant to the job seeker. FIG. 9B depicts additional content 909 for the job classified 901.

Figure 11:
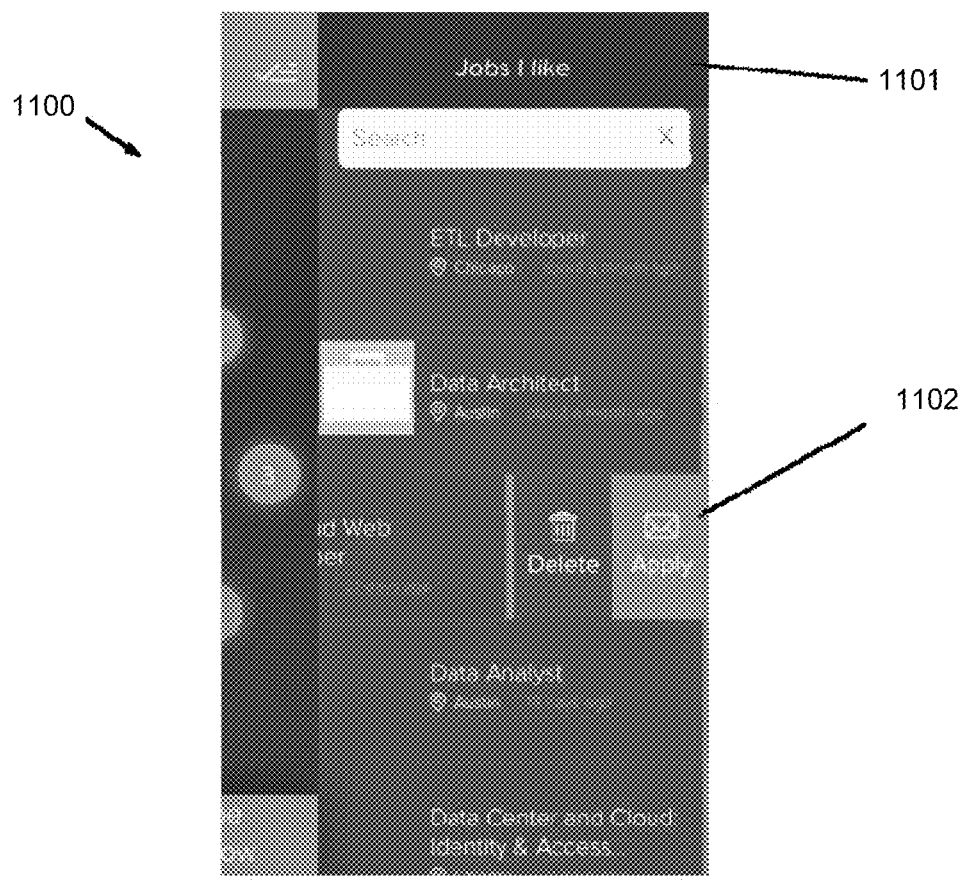
FIG. 11 illustrates an example user interface of a mobile application which presents shortlisted job classifieds.

At step 740 the method 700 includes the job seeker providing input via interaction with the touch screen interface of the mobile device 370. In particular, based on the example interface shown in FIG. 8A, the job seeker may swipe the job classified 801 in a substantially right direction 960 which indicates that the job is considered relevant to the job seeker and additionally puts the job classified 901 into a shortlist as shown in FIG. 11. The job seeker is alternatively able to swipe the job classified 901 in a substantially left direction 970 to indicate that the job classified is considered irrelevant to the job seeker. The mobile device 370 stores feedback data 660 indicative of the job seeker input in memory. As the job seeker performs the swiping gesture when interacting with the touch screen interface, the mobile application 380 visually depicts the job classified 901 moving off the job seeker interface in the direction of the swiping action such that an underlying job classified 902 from the job stack 675 is presented for viewing by the user. Thus, the job seeker's swiping action simultaneously allows the job seeker to input the relevance or irrelevance of the job classified 901 whilst additionally requesting that the next job classified 902 in the job stack 675 is presented to the job seeker.

At step 745, the method 700 includes the mobile device 370 determining if any remaining job classifieds in the stack 675 have yet to be presented to the job seeker. In response to there being one or more remaining job classifieds to be presented, the method returns to step 740 to present the next job classified from the job stack 675. However, in response to there being no remaining job classifieds in the job stack 675 to be presented, the method proceeds to step 750.

At step 750, the method 700 includes the mobile device 370 transferring the recorded feedback data 660 to the server processing system 310 for storage and analysis. The mobile device 370 may additionally generate and transfer a job stack request that is transferred to the server processing system 310. However, it is possible that the transfer of the feedback data 660 to the server processing system 310 acts as a stack request such that in response to receiving the feedback data 660, the server processing system 310 generates further stack data 670.

At step 755, the learned profile engine 330 of the server processing system 310 analyses the feedback data 660 to determine whether modifications to the job seeker profile are required. In particular, the learned profile engine 330 can apply discrete choice analysis using the feedback data 660 to determine whether one or more user profile properties can be concluded or whether one or more existing profile properties of the respective job seeker profile require modification. The learned profile engine 330 can also use explicit matching of skills declared and ranked by the job seeker and skills required for a job classified. Additionally or alternatively, the learned profile engine 330 can use the job seeker's current and former job title to perform the analysis. In the event that the job stack data 670 associated with the feedback data 660 included a hypothetical job classified, the server processing system 310 analyses the portion of the feedback data 660 using statistical inference to determine whether one or more profile properties of the job seeker profile can be populated or updated.

At step 760, the server processing system 310 determines, based on the results of the analysis performed by the learned profile engine 330, if one or more profile properties of the job seeker profile require to be stored or updated for the respective job seeker profile. In response to a negative determination the method proceeds back to step 715 to generate further job stack data 670. In response to a positive determination, the method proceeds to step 765 which includes storing or updating the one or more user profile properties for the respective job seeker profile, and then proceeding back to step 715 to generate further job stack data 670.

In one option, the match engine 320 may perform a batch process periodically to generate and serve new job stack data to the mobile device 371 for the job seeker.

Figure 8A:
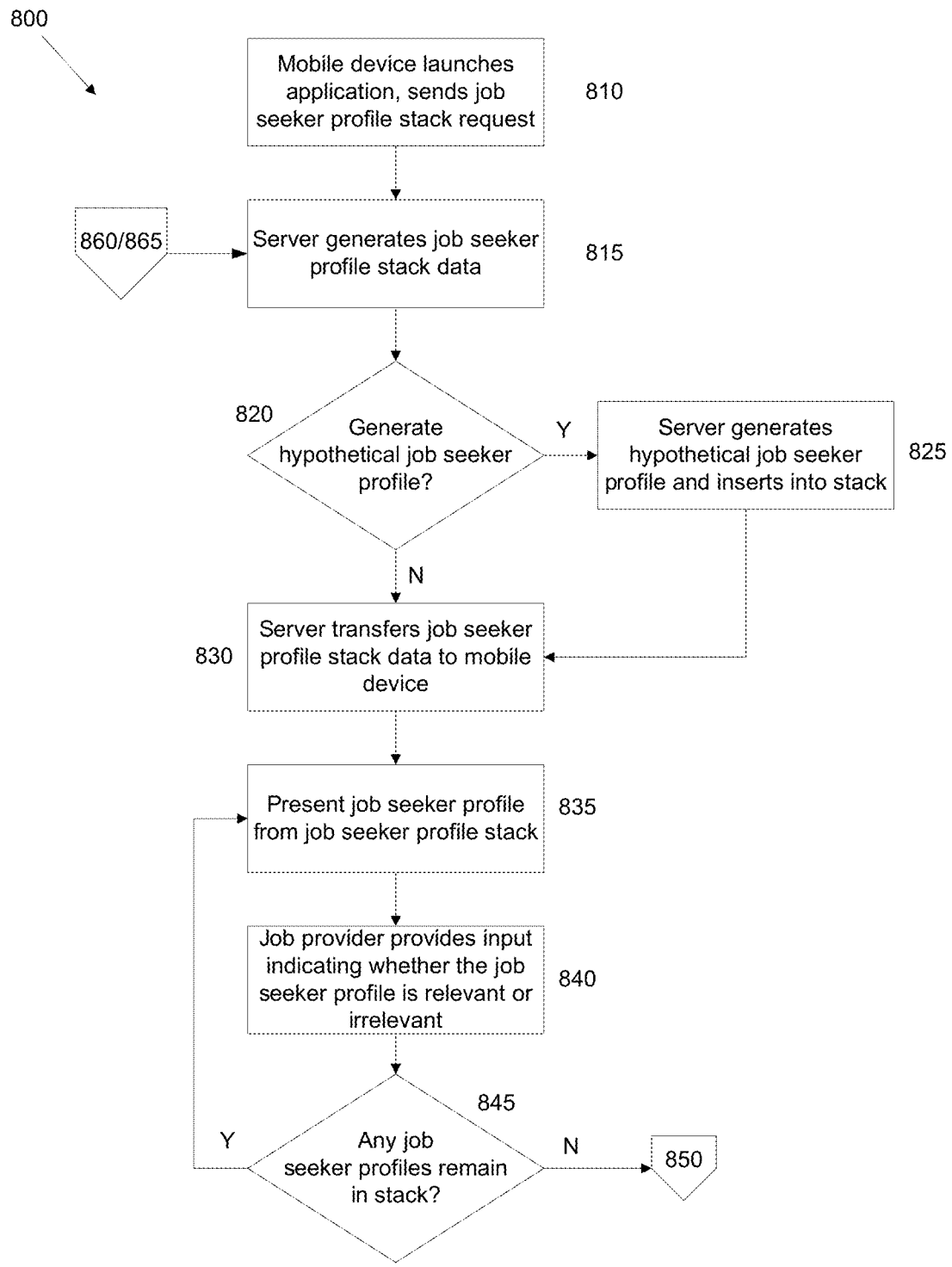
FIGS. 8A and 8B illustrate a flowchart representing a further method for enabling browsing of job seeker profiles.
Figure 8B:
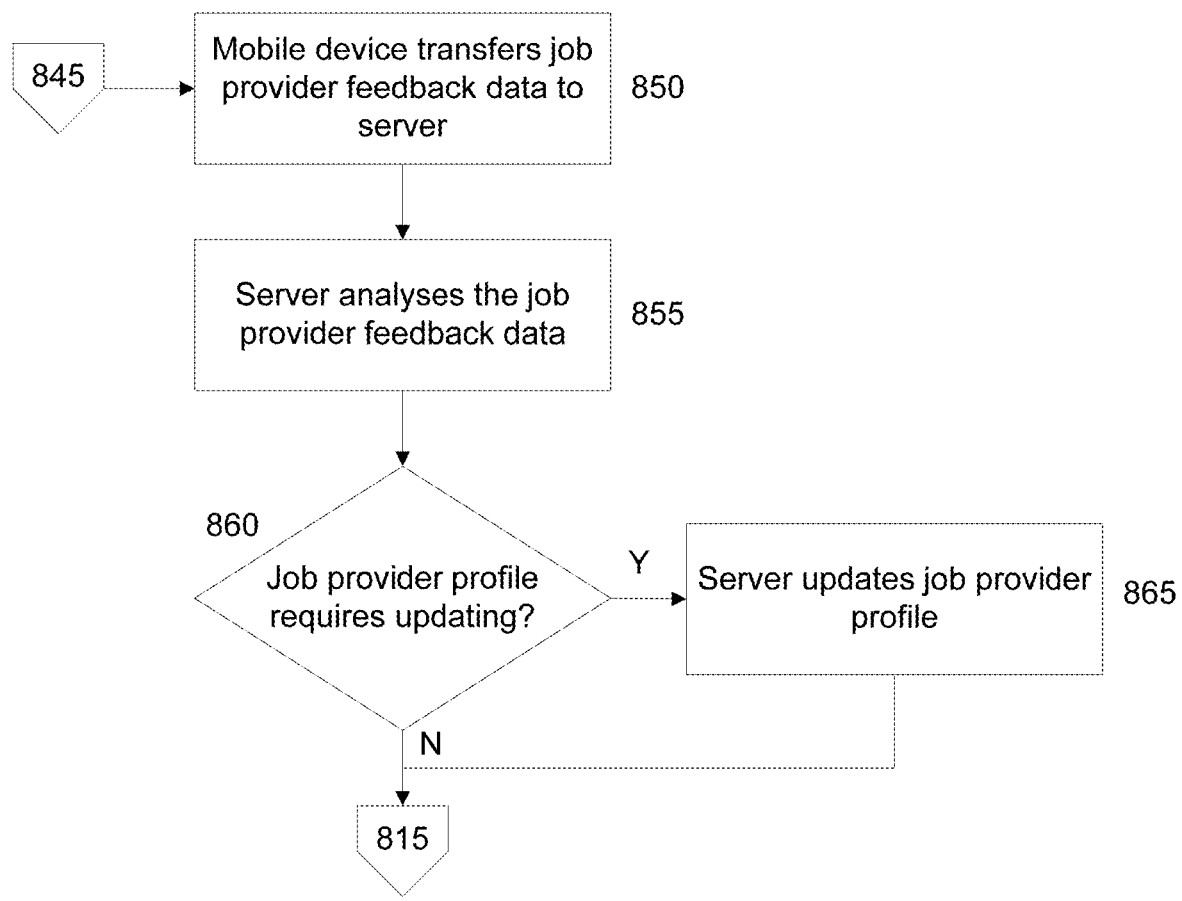

Referring to FIGS. 8A and 8B there is shown a flowchart illustrating a more detailed method 700 performed by the system 600 for enabling a job provider to browse job seeker profiles via a mobile device 371.

In particular, at step 810, the method 800 includes the job provider launching the application 380 on the mobile device 371. In response to launching the application 380, a job seeker profile stack request is transferred by the mobile device 371 under control of the application 380 to the server processing system 310.

At step 815, the method 800 includes the server processing system 310 generating a job seeker profile stack data 672. In particular, the server processing system 310 determines a user identity associated with the job seeker profile stack request and then determines the job provider profile stored in the user profile database 350 based on the user identity. The server processing system 310 then controls the matching engine 320 to generate the job seeker profile stack data 672 indicative of a plurality of relevant job seeker profiles based on the job provider profile. In particular, job seeker profiles which are considered most relevant to the job provider based the respective job provider profile form part of the job seeker profile stack data 672.

The job seeker profile stack data 672 may include a predetermined number of job seeker profiles, such as eight job seeker profiles. The server processing system 310 preferably has stored in memory or has access to a remote data storage means which includes historical viewing data indicative of job seeker profiles which the job provider has already viewed. The match engine 320 can generate the job seeker profile stack data 672 taking into account the historical viewing data such that one or more job seeker profiles that have been previously presented to the job provider are not represented. In addition, the job seeker profile stack data 672 is indicative of an order of presentation of the job seeker profiles. In particular, two similar job seeker profiles may be stored in the job seeker profile stack 672 to be presented one after another such that the learned profile engine 330 can perform a pairwise comparison based on the feedback data 695 to potentially derive one or more profile properties.

At step 820, the method 800 includes the server processing system 310 determining whether one or more hypothetical job seeker profiles are to be generated and inserted into the job seeker profile stack data 672. In particular, the server processing system 310 determines whether a threshold number of job seeker profiles have been previously presented to the job provider which the job provider has indicated as being irrelevant. In the event of a negative determination, the method proceeds to step 830. In response to a positive determination, the method proceeds to step 825.

At step 825, the method 800 includes generating a hypothetical job seeker profile that is inserted into the job seeker profile stack data 672. In particular, the server processing system 310 retrieves from the user profile database 360 a job seeker profile which the job provider indicated as being irrelevant to the job provider. The server processing system 310 then identifies, using the job provider profile of the job provider, one or more portions of the job seeker profile to delete or modify to create the hypothetical job seeker profile. The server processing system 310 then inserts the hypothetical job seeker profile into the job seeker profile stack data 672. It will be appreciated that one of the job seeker profiles in the job seeker profile stack data 672 may be purged to accommodate the hypothetical job seeker profile. The hypothetical job seeker profile is visually presented by the mobile device 371 to clearly indicate to the job provider that the job seeker profile is hypothetical such that the server processing system 310 can infer particular profile properties for adjusting the job provider profile.

At step 830, the method 800 includes the server processing system 310 transferring the job seeker profile stack data 672 to the mobile device 371 for presentation to the job provider. The job seeker profile stack data 672 is stored in memory of the mobile device 371.

Figure 10:
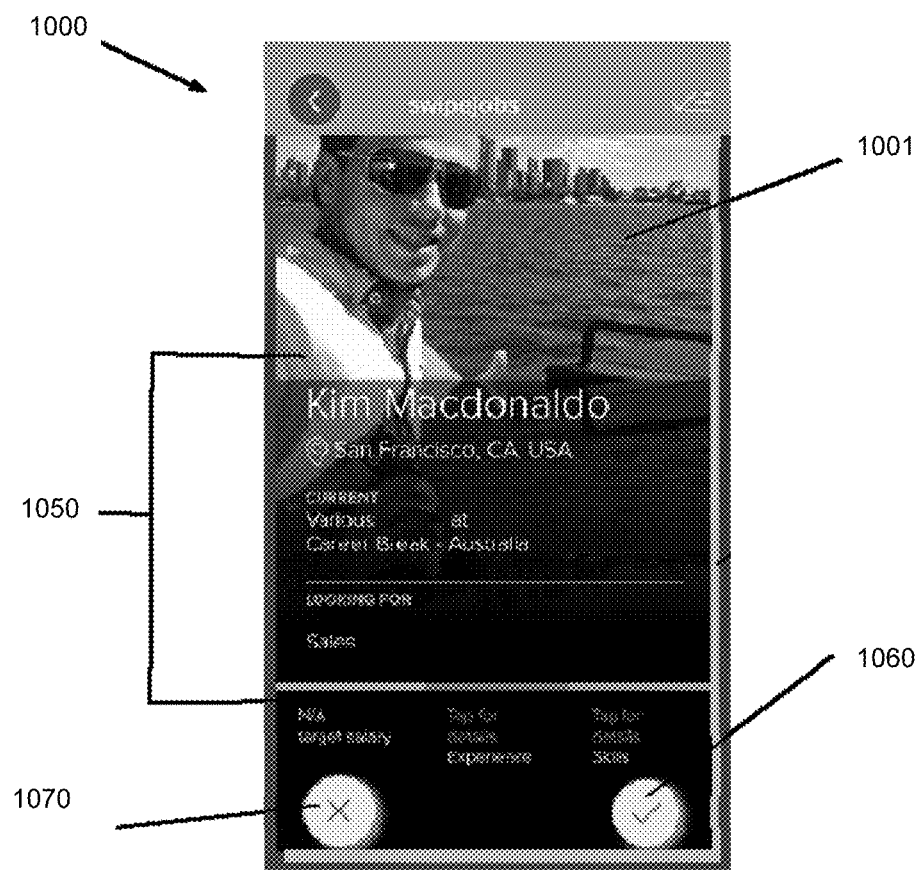
FIG. 10 illustrates an example user interface of a mobile application for enabling browsing of job seeker profiles.

At step 835, in response to receiving the job seeker profile stack data 672 the method 800 includes the application 380 presenting one of the job seeker profiles 801 from the stack 674 to the job provider. Referring to FIG. 10 there is shown another example interface of the mobile application for presenting one of the job seeker profiles to a job provider. The job provider interface 384 presents the job seeker profile 1000 including a job seeker profile picture 1001, the textual summary 1050 of the job seeker profile (i.e. name/location, past work experience, salary range, skills, work preference, etc.). In addition, the job provider interface provides a visual indicator 1060, 1070 of a direction which the job provider should perform a swiping gesture to provide input indicative of whether the respective job seeker profile is relevant or irrelevant to the job provider.

Figure 12:
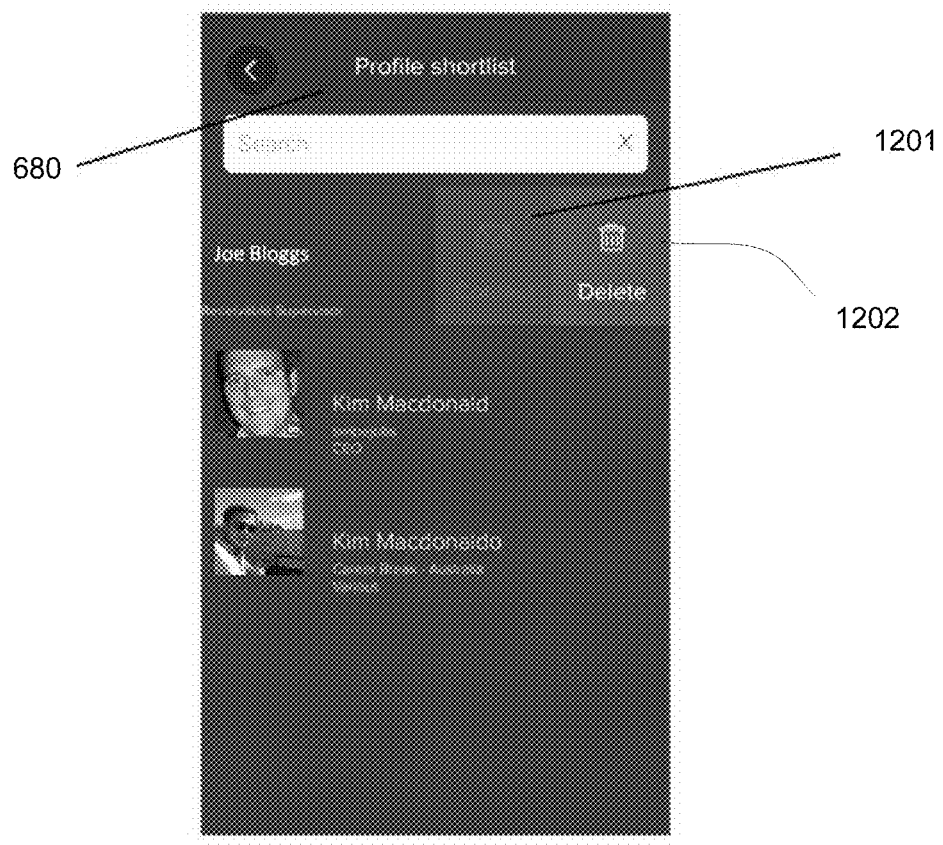
FIG. 12 illustrates an example user interface of a mobile application that presents shortlisted job seeker profiles.

At step 840 the method 800 includes the job provider providing input via interaction with the touch screen interface of the mobile device 371. In particular, the job provider may swipe the job seeker profile 1000 in a substantially right direction which indicates that the job is considered relevant to the job provider and additionally put the job seeker profile into a shortlist as shown in FIG. 12. The job seeker is alternatively able to swipe the job seeker profile in a substantially left direction to indicate that the job seeker profile is considered irrelevant to the job provider such that the job seeker profile is deleted from the stack. The mobile device 371 stores feedback data 695 indicative of the job provider's input in memory.

As the job provider performs the swiping gesture when interacting with the touch screen interface, the mobile application 380 visually depicts the job seeker profile moving off the job provider interface 384 in the direction of the swiping action such that an underlying job seeker profile from the job seeker profile stack 674 is presented for viewing by the job provider. Thus, the job provider's swiping action simultaneously allows the job provider to input the relevance or irrelevance of the job seeker profile whilst additionally requesting that the next job seeker profile in the stack 674 is presented to the job provider.

At step 845, the method 800 includes the mobile device 371 determining if any remaining job seeker profiles in the stack 674 have yet to be presented to the job provider. In response to there being one or more remaining job seeker profiles to be presented, the method returns to step 840 to present the next job seeker profile from the stack 674. However, in response to there being no remaining job seeker profiles in the job seeker profile stack 674 to be presented, the method proceeds to step 850.

At step 850, the method 800 includes the mobile device 371 transferring the recorded feedback data 670 to the server processing system 310 for storage and analysis. The mobile device 371 may additionally generate and transfer a job seeker profile stack request that is transferred to the server processing system 310. However, it is possible that the transfer of the feedback data 695 to the server processing system 310 acts as a stack request such that in response to receiving the feedback data 670, the server processing system 310 generates further stack data 672.

At step 855, the learned profile engine 330 of the server processing system 310 analyses the feedback data 695 to determine whether modifications to the job provider profile are required. In particular, the learned profile engine 330 can apply discrete choice analysis using the feedback data 695 to determine whether one or more user profile properties can be concluded or whether one or more existing profile properties of the respective job provider profile require modification. In the event that the job seeker profile stack data associated with the feedback data 695 included a hypothetical job seeker profile, the server processing system 310 analyses the portion of the feedback data 695 using statistical inference to determine whether one or more profile properties of the job provider profile can be populated or updated.

At step 860, the server processing system 310 determines, based on the results of the analysis performed by the learned profile engine 330, if one or more profile properties of the job provider profile require to be stored or updated for the respective job provider profile. In response to a negative determination the method proceeds back to step 815 to generate a further job seeker profile stack data 672. In response to a positive determination, the method proceeds to step 865 which includes storing or updating the one or more profile properties for the respective job provider profile, and then proceeding back to step 815 to generate further job seeker profile stack data 672.

In a further embodiment, other interactions by the job seeker with the presented job classifieds via the mobile device 370 can be recorded by the application 380 in the memory of the mobile device 370 and transferred as part of the feedback data 660 to the server processing system 310 for analysis. In particular, such additional interactions include the job seeker requesting further information regarding a job classified, applying for a job through the mobile application 380, and referring a job classified to another job seeker 665.

In one form, the job seeker can rank shortlisted jobs according to the job-seeker's preference. Feedback data 660 is transferred from the mobile device 370 to the server processing system 310 for analysis by the learned profile engine 330. Similarly, the job provider can rank shortlisted job seeker profiles according to the job-seeker's preference. Feedback data 695 is transferred from the mobile device 371 to the server processing system 310 for analysis by the learned profile engine 330.

In one variation, a plurality of similar job classifieds or job seeker profiles may be presented side-by-side on the mobile device 370, 371. The job seeker or the job provider can then interact with the user interface to indicate the relevance or irrelevance of the one or more of the job classified or job seeker profiles. The learned profile engine 330 can then perform a pairwise comparison based on the feedback data 670 associated with the simultaneous presentation of the content to determine whether one or more profile properties of the job seeker or job provider profile can be derived.

In one variation the method includes the user providing input via interaction with the touch screen interface of the mobile device 370, 371. In particular, based on the example interface shown in FIG. 8A, the job seeker may swipe the job classified 801 in a substantially downwards direction which indicates the job should be referred to a friend that is likely to match the job identified by the match engine, identified from a list of friends on a social network. Alternatively, the job seeker can interact with button 908 to refer a presented job classified to another job seeker.

In one variation, the job seeker is alternatively able to swipe the job classified 801 in a substantially upwards direction to indicate that there are specific elements of the job classified that the user wishes to provide preferences for, rather than the job classified in total. The preferences can be provided back to the server processing system 310 for analysis by the learned profile engine 330.

In one variation, the job seeker or a job provider are able to directly find a particular job classified or job seeker profile through a scanning pre-generated QR code, selecting a web link, receiving and accepting an electronic invitation, or inputting a pre-assigned identification code.

In preferable forms, the server processing system 310 presents a confirmation request to the user via the mobile device 370, 371 indicating a profile property which has been concluded by the learned profile engine 330 via analysis of the feedback data 670. The user is able to then provide a positive or negative response to the confirmation request, wherein the user profile of the user is updated in response to a positive response. In preferable forms, the user is able to view the user profile generated by the server processing system 310 via the application 380 executing on the mobile device 370, 371.

In one form, the application 380 may be embedded within a parent application. For example, the application 380 may be a module of a social network application.

It will be appreciated that the job seeker profile which is presented as part of a job seeker profile stack 674 is a portion of the job seeker profile record that is stored in the user profile database 360. For example, preferences of the job seeker which have been determined by the system over time would not be information which would be shared with a job provider. Therefore, only a selection of the information in the job seeker profile record is presented to the job provider for review.

Whilst examples have been discussed in relation to a mobile device 370, 371 in the form of a smart phone, it will also be appreciated that other mobile computing devices such as tablet processing systems can equally be used.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A method for matching a job seeker and a job provider, wherein the method includes a server processing system performing the following steps:
   generating and storing in a data store a job seeker profile for the job seeker and a job provider profile for the job provider;
   serving a plurality of job classifieds relevant to the job seeker profile to a first mobile device operated by the job seeker via a graphical user interface of a mobile application executing on the first mobile device, said job seeker interfacing with the graphical user interface to indicate relevant job choices and relevant job features, wherein portions of said job classifieds may wobble or be colored to indicate one or more particular elements;
   receiving job seeker active and passive feedback data indicative of whether each job classified was relevant or not relevant based on the job seeker's interaction with the mobile application;
   updating the job seeker profile stored in the data store using a learning profile engine that utilizes discrete choice modeling based on the job seeker feedback data, such that future job classifieds served to the job seeker are based upon the updated job seeker profile;
   serving a plurality of job seeker profiles relevant to the job provider profile to a second mobile device operated by the job provider via a graphical user interface of the mobile application executing on the second mobile device;
   receiving job provider feedback data indicative of whether each job seeker profile was relevant or not relevant based on the job provider's interaction with the mobile application; and
   retrieve from the data store a matched job seeker profile which the job provider indicated as being not relevant;
   automatically modifying, based on the job provider profile of the job provider, one or more elements of the matched job seeker profile to create a hypothetical job seeker;
   receiving secondary job provider feedback data indicative of whether the hypothetical job seeker was relevant or not relevant based on the job provider's interaction with the mobile application;
   updating the job provider profile cyclically to revise the provider profile or a profile property of the profile stored in the data store using the learning profile engine to perform discrete choice modeling based on the job provider feedback data and secondary job provider feedback data, such that future job seeker profiles served to the job provider are based upon the updated job provider profile.

2. The method according to claim 1, wherein the method includes the server processing system generating the job provider profile for the job provider based upon job provider information accessed from one or more networking services associated with the job provider.

3. The method according to claim 1, wherein the method includes the server processing system generating the job seeker profile for the job seeker based upon job seeker information accessed from one or more networking services used by the job seeker and a location of the first mobile device.

4. The method according to claim 1, wherein the method includes the server processing system generating the job seeker profile for the job seeker based upon information input by the job seeker via the mobile application.

5. The method according to claim 4, wherein the method includes the server processing system aggregating at least a portion of the plurality of job classifieds from one or more third party processing systems.

6. The method according to claim 5 wherein the method includes:
   the server processing system receiving a request from the job seeker to view more information for one of the plurality of job classifieds which was indicated as relevant; and
   the server processing system transferring a network address associated with the respective job classified to the mobile device for presentation to the job seeker, wherein the network address is associated with one of the third party processing systems.

7. The method according to claim 1, wherein the method includes:
   the server processing system receiving a referral request from the job seeker to refer one of the job classifieds to a second job seeker; and
   the server processing system transferring a referred job classified to a device associated with the second job seeker.

8. The method according to claim 1, wherein the method includes the server processing system generating and serving one or more hypothetical job classifieds to the first mobile device to confirm or update a portion of the job seeker profile based on the job seeker feedback data in relation to the job seeker's interaction with the one or more hypothetical job classifieds.

9. The method according to claim 1, wherein the method includes the server processing system generating and serving one or more hypothetical job seeker profiles to the second mobile device to confirm or update a portion of the job provider profile based on the job provider feedback data in relation to the job provider's interaction with the one or more hypothetical job seeker profiles.

10. The method according to claim 2, wherein the one or more networking services include at least one of:
    one or more personal social network services; and
    one or more corporate network services.

11. The method according to claim 1, wherein the job seeker profile of the job seeker includes at least one of:
    working history;
    set of working skills;
    job preference; and
    location preference.

12. A server processing system configured to perform the method of claim 1.

13. A computer readable medium including executable instructions which, when executed by the server processing system, cause the server processing system to perform the method of claim 1.

14. A method for enabling a job provider to browse a plurality of job seeker profiles for a respective plurality of job seekers, wherein the method includes a server processing system performing the following steps:
    generating and storing in a data store the plurality of job seeker profiles for the respective plurality of job seekers and a job provider profile for the job provider;
    serving a plurality of job seeker profiles relevant to the job provider profile to a mobile device operated by the job provider via a graphical user interface on a mobile application executing on the mobile device, said graphical user interface containing visual prompts to report the relevance or non-relevance of the job seeker profile;
    receiving job provider feedback data indicative of whether each job seeker profile was relevant or not relevant based on the job provider's interaction with the mobile application;
    retrieve from the data store a matched job seeker profile which the job provider indicated as being not relevant;
    automatically modifying, based on the job provider profile of the job provider, one or more elements of the matched job seeker profile to create a hypothetical job seeker;
    receiving secondary job provider feedback data indicative of whether the hypothetical job seeker was relevant or not relevant based on the job provider's interaction with the mobile application; and
    updating cyclically the job provider profile stored in the data store based on the job provider feedback data and secondary job provider feedback data when an update determination is made by a learned profile engine utilizing discrete choice modeling, such that future job seeker profiles served to the job provider are based upon the updated job provider profile.

15. The method according to claim 14, wherein the method includes the server processing system generating the job provider profile for the job provider based upon job provider information accessed from one or more networking services associated with the job provider.

16. The method according to claim 15, wherein the one or more networking services include at least one of:
    one or more personal social network services; and
    one or more corporate network services.

17. The method according to claim 14, wherein the method includes the server processing system generating the job provider profile for the job provider based upon information input by the job provider via the mobile application.

18. The method according to claim 14, wherein the method includes the server processing system aggregating at least a portion of the plurality of job seeker profiles from one or more third party processing systems.

19. A server processing system configured to perform the method of claim 14.

20. A computer readable medium including executable instructions which, when executed by the server processing system, cause the server processing system to perform the method of claim 14.

* * * * *